United States Patent
Trythall et al.

(10) Patent No.: US 10,528,126 B2
(45) Date of Patent: Jan. 7, 2020

(54) HELMET TRACKER

(71) Applicant: BAE SYSTEMS PLC, London (GB)

(72) Inventors: Simon Trythall, Rochester (GB); John Richard Williams, Rochester (GB); Peter Michael Knight, Rochester (GB)

(73) Assignee: BAE SYSTEMS PLC, London (GB)

( * ) Notice: Subject to any disclaimer, the term of this patent is extended or adjusted under 35 U.S.C. 154(b) by 0 days.

(21) Appl. No.: 15/758,762

(22) PCT Filed: Sep. 9, 2016

(86) PCT No.: PCT/GB2016/052793
§ 371 (c)(1),
(2) Date: Mar. 9, 2018

(87) PCT Pub. No.: WO2017/042578
PCT Pub. Date: Mar. 16, 2017

(65) Prior Publication Data
US 2019/0041980 A1 Feb. 7, 2019

(30) Foreign Application Priority Data

Sep. 11, 2015 (GB) .................................. 1516120.1

(51) Int. Cl.
*G06F 3/01* (2006.01)
*G09G 5/38* (2006.01)
(Continued)

(52) U.S. Cl.
CPC ........... *G06F 3/012* (2013.01); *G01C 21/165* (2013.01); *G02B 27/0179* (2013.01); *G09G 5/38* (2013.01);
(Continued)

(58) Field of Classification Search
CPC ................ G06F 3/012; G02B 27/0179; G02B 2027/0187; G09G 5/38; G09G 2340/0464;
(Continued)

(56) References Cited

U.S. PATENT DOCUMENTS 4,722,601 A * 2/1988 McFarlane .............. F41G 3/225
345/8
5,807,284 A 9/1998 Foxlin
(Continued)

FOREIGN PATENT DOCUMENTS

| WO | WO 01/80736 A1 | 11/2001 |
| WO | WO 2004/015369 A2 | 2/2004 |
| WO | WO 2015/168675 A1 | 11/2015 |

OTHER PUBLICATIONS

International Search Report and Written Opinion dated Dec. 21, 2016 issued in PCT/GB2016/052793.
(Continued)

*Primary Examiner* — Amare Mengistu
*Assistant Examiner* — Jennifer L Zubajlo
(74) *Attorney, Agent, or Firm* — Scully, Scott, Murphy & Presser, P.C.

(57) ABSTRACT

A method and apparatus are provided for determining the orientation of an object relative to a moving or moveable platform. The object may for example be a helmet worn by a pilot of an aircraft in which orientation of the helmet relative the aircraft while in flight may usefully be known, in particular when determining the position of space-stabilised symbols being displayed in an associated helmet-mounted digital display system. The method and apparatus rely upon a combination or orientation rate data output by an inertial sensor arrangement associated with the object and orientation data output by a non-inertial tracker system associated with the object. Orientation data of the moveable
(Continued)

platform is also used to reference the non-inertial tracker output to inertial space. A correction to the rate data output by the inertial sensor arrangement is determined using rate data derived from data output by the non-inertial tracker referenced to inertial space using orientation data of the moveable platform in inertial space. The corrected rate data are used to determine a predicted orientation for the object at some future time to take account of latency in the tracker process and in any user process relying upon the output of the method, for example a digital helmet-mounted display system displaying space-stabilised symbols.

23 Claims, 5 Drawing Sheets

(51) Int. Cl.
  *G02B 27/01* (2006.01)
  *G01C 21/16* (2006.01)
  *G01S 5/16* (2006.01)
  *G01S 5/18* (2006.01)

(52) U.S. Cl.
  CPC . *G01S 5/16* (2013.01); *G01S 5/18* (2013.01); *G02B 2027/0187* (2013.01); *G09G 2340/0464* (2013.01); *G09G 2354/00* (2013.01); *G09G 2380/12* (2013.01)

(58) Field of Classification Search
  CPC .. G09G 2354/00; G09G 2380/12; G01S 5/16; G01S 5/18
  See application file for complete search history.

(56) References Cited

U.S. PATENT DOCUMENTS

| | | | |
|---|---|---|---|
| 2004/0051680 A1* | 3/2004 | Azuma | G03B 13/28 345/8 |
| 2004/0149036 A1* | 8/2004 | Foxlin | A61B 5/1113 73/511 |
| 2018/0266847 A1* | 9/2018 | Trythall | G01C 25/005 |

OTHER PUBLICATIONS

GB Search Report dated Mar. 14, 2016 issued in GB 1516120.1.
GB Combined Search and Examination Report dated Feb. 28, 2017 issued in GB 1615366.0.
International Preliminary Report on Patentability and Written Opinion dated Mar. 22, 2018 received in International application No. PCT/GB2016/052793.

* cited by examiner

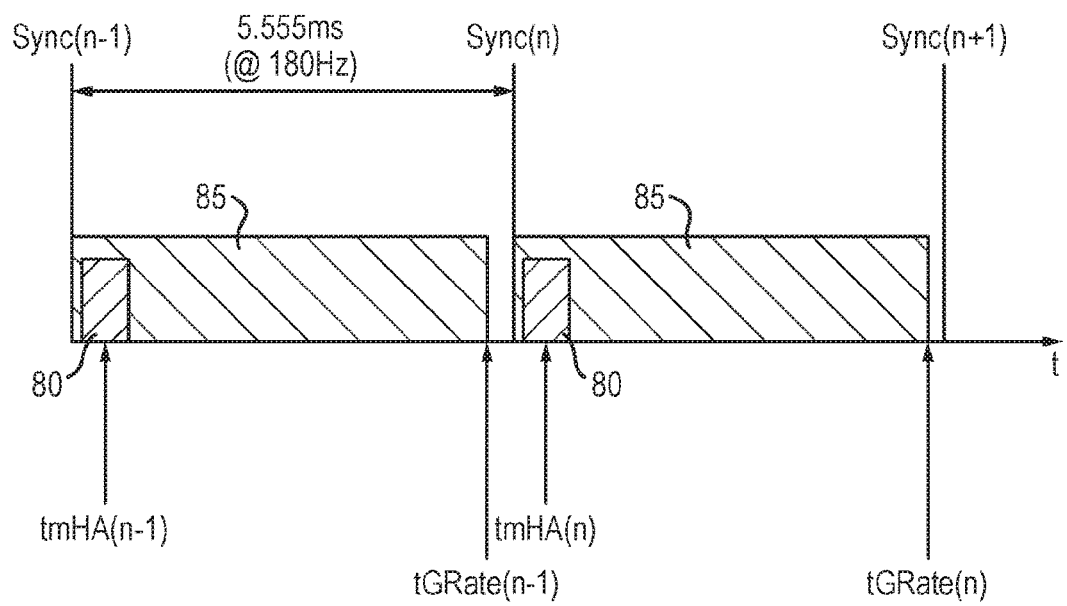
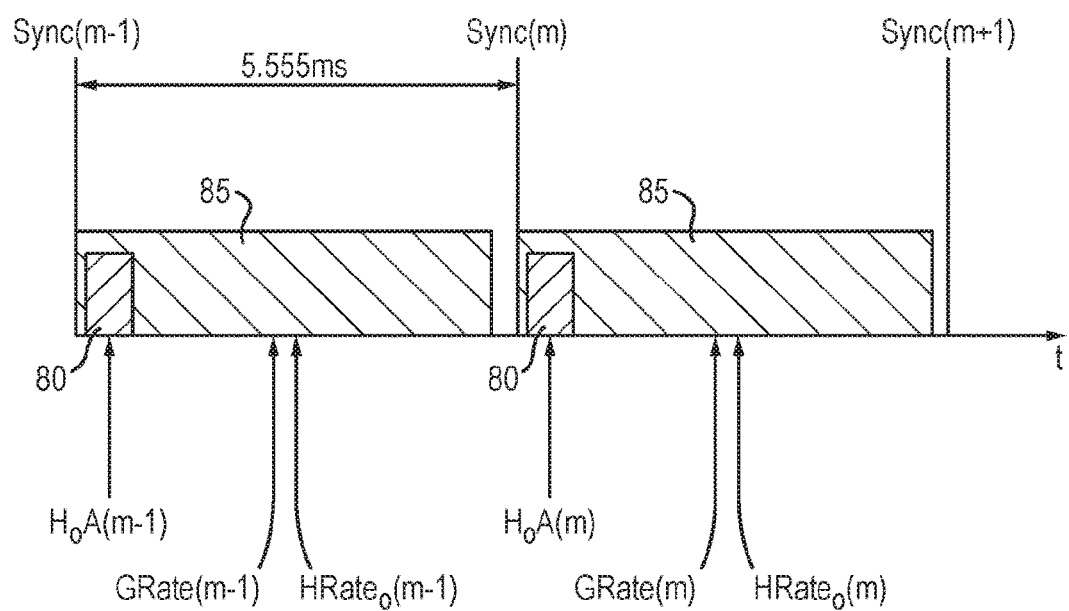

HELMET TRACKER

The present invention relates to the tracking of an object and in particular, but not exclusively, to the determination and tracking of orientation of the object relative to a moveable platform. The present invention finds particular application in the determination and tracking of orientation of a helmet or other body-worn device when worn by a user travelling on or within a moveable platform, such as an aircraft. The present invention also extends to a head or helmet-mounted display system incorporating such a tracking system to provide head or helmet orientation data for use in positioning display artefacts in a display.

It is known to include a helmet or head tracker system in a helmet or head-mounted display system in which the positioning of symbols or other artefacts in the display is to be determined according to orientation of the user's head relative to a movable reference frame, for example relative to a cockpit or other interior region of an aircraft or to a driver's or other position in a land vehicle or other type of vehicle.

Various different types of tracker system are known, using a variety of different sensor technologies. For example, Proc. SPIE 8735, Head- and Helmet-Mounted Displays XVIII: Design and Applications, 873502 (May 16, 2013) describes a hybrid optical/inertial helmet tracker system for use with head and helmet-mounted displays. An example of a helmet tracker using electromagnetic techniques is available from Polhemus® Inc, for example as described in a White Paper entitled 'Accuracy and Resolution in Electromagnetic 6 Degree-of-freedom (6DOF) Measurement Systems', APB 8500-001A, available from http:///www.polhemus.com. However, known tracker systems are not generally able to anticipate some of the particular needs of head or helmet-mounted digital display systems relying upon an associated tracking system to supply orientation data that can be used to generate and position space-stabilised symbols or other artefacts in the display, i.e. symbols that appear to a user of the display to be fixed in a far-field view of space, aligned with an externally visible point or object, despite head movement.

The present invention is defined, in its various aspects, in the attached claims. In particular, according to a first aspect of the present invention, there is provided a tracker system for determining orientation of an object relative to a moveable platform, comprising:

an inertial sensor arrangement associated with the object and arranged to output rate data indicative of a rate of change in orientation of the object in inertial space;

a non-inertial tracker system associated with the object, arranged to determine and to output orientation data indicative of orientation of the object relative to the moveable platform;

an input for receiving orientation data indicative of orientation of the moveable platform in inertial space;

a conversion component for receiving orientation data output by the non-inertial tracker system for converting a measure of orientation of the object relative to the moveable platform into a measure of orientation of the object in inertial space using a corresponding measure of orientation of the moveable platform in inertial space and for converting two or more successive measures of orientation of the object in inertial space into an estimate of the rate of change in orientation of the object in inertial space;

a corrector component arranged to calculate corrections to rate data output by the inertial sensor arrangement, using a plurality of substantially synchronised combinations of rate data output by the inertial sensor arrangement and rate data output by the conversion component and to apply the calculated corrections to a current measure of rate data by the inertial sensor arrangement; and a predictor component arranged to calculate, by integrating the corrected rate data output by the corrector component and by forward prediction, an orientation of the object in inertial space at a predetermined prediction time relative to a time point of validity of the corrected rate data.

According to this first aspect of the present invention, the orientation of an object may be determined for some time later than the time at which the various sensor outputs are defined. This enables a user of the determined orientation not simply to receive up-to-date data, but to receive data for which any latency in a user system, for example a digital display device, has been anticipated by forward prediction of the changing orientation of the object. In generating such predicted data, the tracker system has the advantage over user systems in being able to take account of factors other than the history of orientation changes of the object to provide a more accurate forward prediction than might otherwise be possible using data from prior art tracker systems.

In an example embodiment, the corrector component is arranged to determine corrections to any one or more of: misalignment of the inertial sensor arrangement with a frame of reference of the object; misalignment of one or more sensors within the inertial sensor arrangement; relative scaling; inertial sensor noise; and inertial sensor bias. Moreover, the corrector component is able to determine corrections due to misalignment or relative scaling separately from corrections for inertial sensor bias.

In an example embodiment, the corrector component and the predictor component are arranged to operate in a cyclic manner, the corrector component operating according to corrections update cycles and the predictor component operating according to tracker cycles. The corrector component is therefore able to operate independently of the predictor component, enabling the data to be sampled from the inertial sensor arrangement at a different rate to that of the non-inertial tracker system and to be resilient to variations in availability of the data required to determine corrections of the various types.

In example embodiments, the corrections update cycle period is the same as the tracker cycle period or the corrections update cycle period is a predetermined integer multiple of the tracker cycle period.

In a particular embodiment, the tracker cycle time period corresponds to a time period between time points of validity of successive measures of rate data representative of a respective sample of rate data output by the inertial sensor arrangement during a tracker cycle.

In another embodiment, rate data may be obtained from the inertial sensor arrangement at a higher rate than that derived from output by the non-inertial tracker system such that a rate measurement is obtained from the inertial sensor arrangement during every tracker cycle, but a measurement of the orientation of the object is obtained from the non-inertial tracker system on a less frequent schedule. Scheduling of this form may be advantageous in several ways. For example, a more rapid determination of changes in orientation from inertial sensor data may be achieved where the rate of update might otherwise have been limited by signal durations in the non-inertial sensor system, such signals being light, magnetic or acoustic pulses. Furthermore, a reduction in the power contained in signals emitted by the non-inertial tracking system may be possible, for example of light pulses emitted during operation of an optical tracker system. This may not only reduce power consumption but also render such signals less easily detectable by external agencies; in the case of the light signals, during night-time operation.

In an example embodiment, the tracker system includes a first filter component, arranged to receive a sample of rate data output by the inertial sensor arrangement during a tracker cycle period and to calculate for the received sample, and to output, a single measure of rate data representative of output by the inertial sensor arrangement during the tracker cycle. This enables some of the noise in rate data output by the inertial sensors to be suppressed.

Various measures may be included in example embodiments to ensure data synchronisation between the different sensor system outputs. In an example embodiment, the conversion component is arranged:

to receive a sequence of outputs of orientation data by the non-inertial tracker system;

to receive a sequence of inputs of data indicative of orientation of the moveable platform;

to select, from the received sequences, an output of orientation data by the non-inertial tracker system having a time point of validity that falls between the time points of validity of two consecutive inputs of data indicative of orientation of the moveable platform and to determine, by interpolation, an estimate of the orientation of the moveable platform in inertial space at the time point of validity of the selected output of orientation data by the non-inertial tracker system; and to convert the selected output of orientation data by the non-inertial tracker system into a measure of orientation of the object in inertial space using the determined estimate of orientation of the moveable platform in inertial space.

This enables the tracker system to adapt to differences in the periodicity of sensor system outputs associated with the platform and of outputs by the non-inertial tracker system to enable data with a common time point of validity to be combined in subsequent processing.

As an alternative technique for synchronising data from the platform and the non-inertial tracker system, a second predictor component arranged to receive inputs of orientation data indicative or orientation of the moveable platform in inertial space and to predict, from two or more successive said inputs, or using a rate derived therefrom, a measure of orientation of the moveable platform in inertial space at a time point of validity of orientation data output by the non-inertial tracker system.

This has the advantage that more recently generated data from the non-inertial tracker system may be combined with data from the platform.

In an example embodiment, the correction component is arranged:

to receive a plurality of measures of rate data representative of output by the inertial sensor arrangement during a respective plurality of tracker cycles; and to select from the received plurality of measures of rate data a measure having substantially the same time point of validity as that of a measure of rate data output by the conversion component.

This ensures also that data output by the inertial sensor arrangement may be selected with the same time point of validity as data from the other two data sources.

In an example embodiment, further measures may be taken to reduce noise in rate data, whether derived from the non-inertial tracker output or output by the inertial sensor arrangement. To the end, the corrector component includes a second filter component arranged to receive measures of rate data output by the conversion component and to apply a filter thereto. The filter may be a finite impulse response filter or an infinite impulse response filter. A third filter component is also provided, arranged to receive measures of rate data representative of output by the inertial sensor arrangement during respective tracker cycles and to apply thereto a filter corresponding to the filter implemented by the second filter component.

These features ensure that data provided from the various data sources for use by the corrector component has been time-synchronised and filtered using the same filter profiles.

In an example embodiment, the predictor component is associated with or incorporates an integrator component arranged to receive corrected rate data from the corrector component and to determine an orientation of the object at the time point of validity of the received corrected rate data.

To ensure that the orientation determined by the integrator component provides a good starting point for the predictor component to predict forward, the integrator component is arranged to receive from the conversion component converted measures of orientation of the object in inertial space and to implement a process for using the received converted measures to reduce an error of integration arising from the determination of orientation of the object by integration of the received corrected rate data.

In an example embodiment, the corrector component is arranged to determine a correction for misalignment or relative scaling by:

assembling a set of four filtered measures of rata data representative of respective samples of rate data output by the inertial sensor arrangement, each filtered measure being selected for inclusion in the set according to predetermined selection criteria and each selected measure defining a point in an inertial sensor rate space;

selecting four filtered measures of rate data output by the conversion component, each selected measure defining a corresponding point in a derived object orientation rate space, the four selected measures having substantially the same time points of validity as the four selected measures of rate date representative of samples of rate data output by the inertial sensor arrangement; and determining a correction based upon a mapping of an arrangement of vectors linking the points in the inertial sensor rate space to an arrangement of vectors linking the corresponding points in the derived object orientation rate space.

Determining a correction includes calculating a transformation matrix representing the mapping.

Selection for inclusion in the set of a filtered measure of rate data respective of a sample of rate data output by the inertial sensor arrangement and of a corresponding filtered measure of rate data output by the conversion component triggers the calculation of an update to the corrections by the correction component. However, the number of corrections update cycles that elapse between successive calculations of an update to the corrections by the corrections component may vary according to availability of filtered measures of rate data satisfying the predetermined selection criteria.

In an example embodiment, the predetermined selection criteria require that for newly received filtered measure of rate data from the inertial sensor arrangement to be accepted into an assembled set, a vector linking the point represented by the newly received measure of rata data in inertial sensor rate space to a nominated reference point in the set is approximately orthogonal to the plane of the other three points in the set, and that the magnitude of the linking vector exceeds a predetermined minimum magnitude.

To assemble such a set, at each new tracker cycle, the respective filtered inertial sensor rate data are tested against the predetermined selection criteria and, if accepted, are included in the set, displacing the oldest of the four selected inertial sensor rate data, the corresponding filtered non-inertial tracker rate data being also accepted into the set, displacing the non-inertial tracker rate data corresponding to the displaced inertial sensor rate data. Acceptance of filtered inertial sensor and non-inertial tracker rate data into the set triggers a new correction cycle.

For convenience, the filtered inertial and non-inertial tracker rate data comprise rate vectors.

By calculating a mapping between sets of vectors linking points in rate space, rather than between the rate vectors themselves, the advantage recited above of being able to determine corrections for misalignment or relative scaling separately from corrections for bias may be achieved.

In an example embodiment, the correction component determines a correction for inertial sensor bias by calculating the vector translation between a point in the derived object orientation rate space, defined by applying the determined misalignment or relative scaling correction to a recent filtered measure of rate data representative of a sample of rate data output by the inertial sensor arrangement, and a point in the derived object orientation rate space defined by a substantially synchronised filtered measure of rate data output by the conversion component and applies the correction for bias to the result of applying the misalignment or relative scaling correction to a most recent measure of rate data representative of a sample of rate data output by the inertial sensor arrangement.

In an example embodiment, the corrections component is arranged to apply a stabilisation control process to the application of a newly calculated update to the misalignment or relative scaling correction whereby a corrective contribution by each newly calculated correction is reduced over a sequence of corrections update cycles relative to that calculated during an immediately preceding corrections update cycle.

This has the benefit of reducing the impact of corrective swings during stabilisation, allowing for a relatively large correction during the initial correction cycles and a progressively smaller contribution on subsequent correction cycles with the effect that the difference in peak amplitude of the corrective effects from one correction cycle to the next reduces.

As a further measure, to smooth the introduction of a newly calculated correction, the corrections component is arranged to apply an iterative damping process to the application of a correction whereby a newly calculated correction is introduced over a sequence of tracker cycles as an increasing corrective contribution relative to a contribution by an immediately preceding correction such that the correction applied over the sequence of tracker cycles gradually converges to the newly calculated correction. This damping process may be applied separately to corrections for misalignment or relative scaling and corrections for bias.

Having determined a predicted orientation for the object, in an example embodiment the tracker system includes a fourth filter component arranged to receive predicted orientation data from the predictor component and to apply a filter thereto. This provides an opportunity to take account of certain operating conditions that may affect the determination of orientation of the object. For example, the tracker system may further comprise a buffet measuring component for detecting buffeting or other rapid changes in orientation of the object using corrected rate data output by the corrector component and a buffet compensating component for calculating adjustments to filter parameters of the fourth filter component and to operation of the predictor component.

In an example embodiment, the fourth filter component is arranged to implement a finite impulse response filter and the buffet compensating component is arranged to adjust the latency of the filter implemented by the fourth filter component according to the level of buffeting or rapidity of change in orientation of the object detected by the buffet measuring component.

In an example embodiment, the buffet measuring component is arranged to determine the level of buffeting or rapidity of change in orientation using two stages of filtering by finite impulse response filters with symmetric weighting, the first stage being applied to received corrected rate data and the second stage being applied to differences between weighted average corrected rate data output by the first stage and mid-history corrected rate data.

If a user of the information provided by the tracker system requires orientation of the object to be specified with reference to the moveable platform rather than with reference to the inertial frame of reference, a second conversion component may be provided, arranged:

to receive the output from the predictor component of orientation of the object in inertial space;

to receive data defining an orientation of the moveable platform in inertial space; and to determine therefrom orientation of the object relative to the moveable platform.

In an example embodiment, the non-inertial tracker system is an optical tracker system, an acoustic tracker system or a magnetic tracker system.

In example embodiments of the tracker system according to this first aspect of the present invention, the object may be a head or helmet or other body-worn item to which the inertial sensor arrangement is attached and wherein the non-inertial tracker system is arranged to determine and to output data indicative of the orientation of the head or helmet or other body-worn item.

According to a second aspect of the present invention, in a typical application of the tracker system according to this first aspect of the present invention, there is provided a head or helmet-mounted digital display device arranged to display space-stabilised symbols or other space-stabilised display artefacts, including a tracker system according to the first aspect of the present invention for determining orientation of the head or helmet in which the object is a head or a helmet on which is mounted the head or helmet-mounted display and wherein the predetermined prediction time corresponds to an expected time between a time point of validity of sensor data and an expected time of displaying a space-stabilised symbol or other space-stabilised display artefact positioned by the display device to take account of an orientation of the head or helmet indicated by an output of predicted orientation by the tracker system.

According to a third aspect of the present invention, and with similar advantages to those recited above, there is provided a computer-implemented method for determining orientation of an object relative to a moveable platform, comprising the steps:

(i) receiving, from an inertial sensor arrangement associated with the object, a sample of rate data indicative of a rate of change in orientation of the object in inertial space;

(ii) receiving, from a non-inertial tracker system associated with the object, orientation data indicative of orientation of the object relative to the moveable platform;

(iii) receiving, from a sensor system associated with the moveable platform, orientation data indicative of orientation of the moveable platform in inertial space;

(iv) converting orientation data received at step (ii) into a measure of orientation of the object in inertial space using a corresponding measure of orientation of the moveable platform in inertial space determined from orientation data received at step (iii) and calculating, from two or more successive measures of orientation of the object in inertial space, rate data providing an estimate of the rate of change in orientation of the object in inertial space;

(v) calculating corrections to rate data received from the inertial sensor arrangement using a plurality of substantially synchronised combinations of rate data output by the inertial sensor arrangement and rate data determined at step (iv) and applying the calculated corrections to a current measure of rate data from the inertial sensor arrangement; and (vi) using the corrected inertial sensor rate data to calculate, by integrating the corrected rate data output at step (v) and by forward prediction, an orientation of the object in inertial space at a predetermined prediction time relative to a time point of validity of the rate data corrected at step (v).

The corrections may include corrections for any one or more of: misalignment of the inertial sensor arrangement with a frame of reference of the object; misalignment of one or more sensors within the inertial sensor arrangement; relative scaling; inertial sensor noise; and inertial sensor bias. At step (v), a correction for misalignment or relative scaling is calculated separately to the calculation of a correction for inertial sensor bias.

In an example embodiment of the method, steps (i) to (vi) are arranged to operate in a cyclic manner, with step (v) operating according to corrections update cycles and step (vi) operating according to tracker cycles. The corrections update cycle period may be the same as the tracker cycle period or the corrections update cycle period may be a predetermined integer multiple of the tracker cycle period. The corrections update cycle period may correspond to a time period between successive time points of validity of orientation data received from the non-inertial tracker system In an example embodiment, step (i) comprises receiving the sample of rate data received from the inertial sensor arrangement during a tracker cycle period and includes applying a first filtering process to calculate, for the received sample, a single measure of rate data representative of the sample during the tracker cycle period.

In an example embodiment, step (iv) further comprises:
receiving a sequence of inputs of orientation data from the non-inertial tracker system;
receiving a sequence of inputs of data indicative of orientation of the moveable platform;
selecting, from the received sequences, an input of orientation data from the non-inertial tracker system having a time point of validity that falls between the time points of validity of two consecutive inputs of data indicative of orientation of the moveable platform and to determine, by interpolation, an estimate of the orientation of the moveable platform in inertial space at the time point of validity of the selected input of orientation data by the non-inertial tracker system; and
converting the selected input of orientation data from the non-inertial tracker system into a measure of orientation of the object in inertial space using the determined estimate of orientation of the moveable platform in inertial space.

In an example embodiment, step (iv) may alternatively comprise operating a second predictor process arranged to receive inputs of orientation data indicative or orientation of the moveable platform in inertial space and to predict, from two or more successive said inputs, or using a rate derived therefrom, a measure of orientation of the moveable platform in inertial space at a time point of validity of orientation data input from the non-inertial tracker system.

In an example embodiment, step (v) includes:
receiving a plurality of measures of rate data representative of output by the inertial sensor arrangement during a respective plurality of tracker cycles; and
selecting from the received plurality of measures of rate data a measure having substantially the same time point of validity as that of rate data output calculated at step (iv).

In an example embodiment, step (iv) includes a step of applying a second filter process to the calculated rate data. The second filter process may implement a finite impulse response filter or an infinite impulse response filter.

In an example embodiment, step (v) includes applying a third filter process arranged to receive a plurality of measures of rate data representative of output by the inertial sensor arrangement during respective tracker cycles and to apply thereto a filter corresponding to that applied by the second filter process implemented at step (iv).

In an example embodiment, step (vi) includes applying an integration process to received corrected inertial sensor rate data from step (v) to determine an orientation of the object at a time point of validity of the received corrected rate data. In particular, the integration process receives converted measures of orientation of the object in inertial space from step (iv) and uses the received converted measures to reduce an error of integration arising from the determination of orientation of the object by integration of the received corrected rate data.

In an example embodiment of the method, step (v) further comprises determining corrections for misalignment or relative scaling by:
assembling a set of four filtered measures of rata data representative of respective samples of rate data received from the inertial sensor arrangement, each filtered measure being selected for inclusion in the set according to predetermined selection criteria and each selected measure defining a point in an inertial sensor rate space;
selecting four filtered measures of rate data calculated at step (iv), each selected measure defining a corresponding point in a derived object orientation rate space, the four selected measures having substantially the same time points of validity as the four selected measures of rate date representative of samples of rate data received from the inertial sensor arrangement; and
calculating a correction based upon a mapping of an arrangement of vectors linking the points in the inertial sensor rate space to an arrangement of vectors linking the corresponding points in the derived object orientation rate space.

In an example embodiment of the method, step (v) further comprises, at each corrections update cycle:
receiving filtered rate data representative of a sample of rate data received from the inertial sensor arrangement during a new tracker cycle;
testing the received filtered rate data against the predetermined selection criteria; and
if accepted, including the received filtered rate data in the set, displacing the oldest of four selected measures representing inertial sensor rate data, also accepting into the set a corresponding filtered measure of rate data calculated at step (iv), displacing the calculated measure of rate data corresponding to the displaced measure representing inertial sensor rate data. At step (v), accepting a received filtered measure of rate data into the set triggers the calculation of a correction or an update to a correction.

In an example embodiment of the method, the number of corrections update cycles that elapse between successive calculations of an update to the corrections at step (v) varies according to availability of filtered measures of rate data satisfying the predetermined selection criteria.

For convenience of processing, the filtered rate data comprise rate vectors.

In an example embodiment of the method, at step (v), the predetermined selection criteria require that for a received filtered measure of rate data from the inertial sensor arrangement to be accepted into an assembled set, a vector linking a point represented by the newly received measure of rata data in inertial sensor rate space to a nominated reference point in the set is approximately orthogonal to the plane of the other three points in the set, and that the magnitude of the linking vector exceeds a predetermined minimum magnitude.

In an example embodiment of the method, at step (v), calculating a correction for a correction for inertial sensor bias comprises calculating the vector translation between a point in the derived object orientation rate space, defined by applying the determined misalignment or relative scaling correction to a received filtered measure of rate data representative of a sample of rate data output by the inertial sensor arrangement, and a point in the derived object orientation rate space defined by a substantially synchronised filtered measure of rate data calculated at step (iv).

In an example embodiment of the method, at step (v) includes applying a stabilisation control process to the application of a newly calculated update to the misalignment or relative scaling correction whereby a corrective contribution by each newly calculated correction is reduced over a sequence of corrections update cycles relative to that calculated during an immediately preceding corrections update cycle.

In an example embodiment of the method, step (v) includes applying an iterative damping process to the application of a correction whereby a newly calculated correction is introduced over a sequence of tracker cycles as an increasing corrective contribution relative to a contribution by an immediately preceding correction such that the correction applied over the sequence of tracker cycles gradually converges to the newly calculated correction.

In an example embodiment, step (vi) further comprises applying to the predicted orientations of the object a fourth filter process.

In an example embodiment, the method may further comprise:
a buffet measuring step for detecting buffeting or other rapid changes in orientation of the object using corrected rate data determined at step (v); and
a buffet compensating step for calculating adjustments to filter parameters of the fourth filter process and to the prediction of orientation of the object at step (vi).

The fourth filter process may be arranged to implement a finite impulse response filter and the buffet compensating step may be arranged to adjust the latency of the fourth filter process according to the level of buffeting or rapidity of change in orientation of the object detected at the buffet measuring step.

In an example embodiment of the method, the buffet measuring step is arranged to determine the level of buffeting or rapidity of change in orientation using two stages of filtering by finite impulse response filtering processes with symmetric weighting, the first stage being applied to received corrected rate data from step (v) and the second stage being applied to differences between weighted average corrected rate data output by the first stage and mid-history corrected rate data.

In an example embodiment, the method may further comprise a second transformation step comprising:
receiving the predicted orientation of the object in inertial space from step (vi);
receiving data defining an orientation of the moveable platform in inertial space, calculated at step (iv); and
determining therefrom a predicted orientation of the object relative to the moveable platform.

In an example embodiment, the object is a head or helmet or other body-worn item to which the inertial sensor arrangement is attached and wherein the non-inertial tracker system is arranged to determine and to output data indicative of the orientation of the head or helmet or other body-worn item.

According to a fourth aspect of the present invention, there is provided a computer program product comprising a data carrier having stored thereon software code means, or means for access thereto, which when installed and executed upon a digital processor are arranged to implement the method steps according to the third aspect of the present invention.

According to a fifth aspect of the present invention, there is provided a digital processor programmed to implement the method steps according to the third aspect of the present invention.

According to a sixth aspect of the present invention, there is provided a helmet-mounted display system for use in a moveable platform, the display system including a helmet tracker system according to the first aspect of the present invention to determine a predicted orientation of the helmet for use in determining the position of artefacts for display, the helmet tracker system comprising an arrangement of inertial sensors mounted on the helmet and an optical tracker system comprising a plurality of switchable light sources mounted upon the helmet and one or more optical sensors mounted at respective known positions within the moveable platform.

According to a seventh aspect of the present invention, there is provided a tracker system for determining orientation of an object relative to a moveable platform, comprising:
an inertial sensor system associated with the object and arranged to output first rate data indicative of a rate of change in orientation of the object;
a non-inertial tracker system associated with the object, arranged to determine and to output, first orientation data indicative of orientation of the object with reference to the moveable platform;
an input for receiving second orientation data from a sensor system associated with the moveable platform arranged to output the second orientation data indicative of orientation of the moveable platform in inertial space; and
at least one data processor connected to at least one memory that stores software instructions, where execution of the software instructions by the at least one data processor configured automatically:

to calculate corrections to errors in the first rate data using second rate data derived from the first orientation data referenced to inertial space using the second orientation data and to apply the calculated corrections to the first rate data to determine third rate data; and to calculate, using the third rate data, an orientation of the object in inertial space at a predetermined prediction time relative to a time point of validity of the first rate data.

Example embodiments of the present invention will now be described in more detail with reference to the accompanying drawings, of which:

FIG. 2 shows example timing for a cyclic tracking process implemented by embodiments of the present invention;

Figure 1:
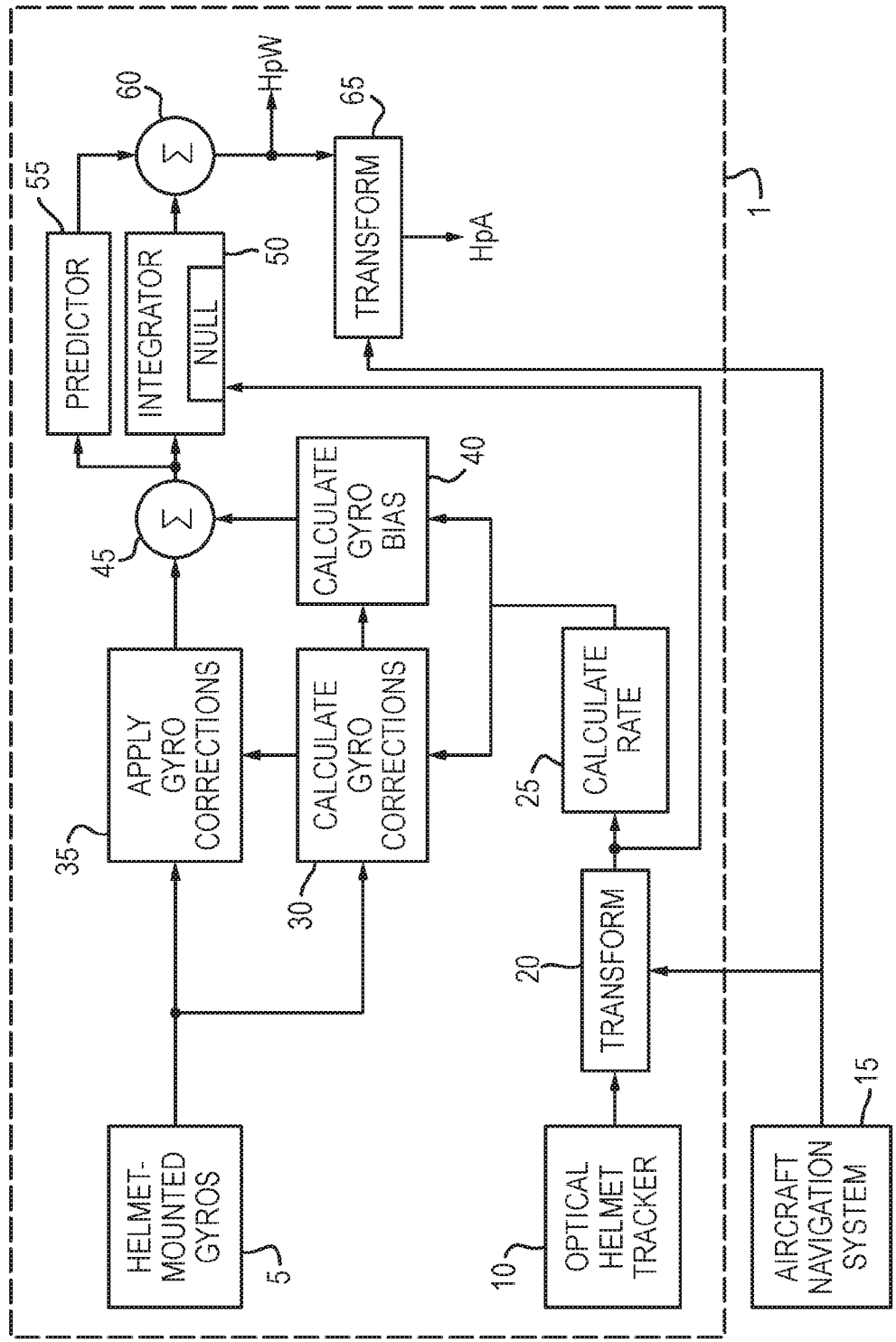
FIG. 1 depicts a functional architecture for a helmet tracker system according to example embodiments of the present invention.

A system according to example embodiments of the present invention is arranged to determine and to monitor the orientation of an object relative to a moveable platform on which the object may be travelling or is otherwise associated. The object may be considered associated with the moveable platform if the magnitude of relative velocity of the object and the moveable platform is substantially zero at a time of determining the object's orientation relative to the platform. Embodiments of the present invention will be described below in the example context of a helmet tracker system intended for use with the helmet of a pilot of an aircraft. More particularly, embodiments of the present invention will be described in the context of such a helmet tracker system when used in association with a helmet-mounted display system. However, the present invention may be applied to the tracking of orientation of other types of object associated with a moveable platform.

The description that follows is of a logical system architecture designed to explain the principles underlying operation of the helmet tracker system of the present invention. It will be clear to a notional skilled person that the helmet tracker system may be implemented using an object-oriented data processing architecture in which functional components of the system may be combined and distributed differently to that in a logical sequential architecture to be described below. However, the principles of operation are likely to remain substantially unchanged and the description that follows may at least serve as a detailed requirements specification for the functions to be implemented in whatever data processing architecture is chosen.

For the purposes of the description that follows, the following conventions and terminology will be assumed for the labelling of axes and rotations. Axes will be labelled 'x', 'y' and 'z' and angles of rotation will be labelled as $\psi$, $\theta$ and $\varphi$. Where the angles of rotation as defined as Euler angles: $\psi$ is an Azimuth angle; $\theta$ is an Elevation angle; and $\varphi$ is a Roll angle. Where axes and rotations are defined with respect to Avionic Axes, the following conventions will apply:

axes are defined with respect to an origin O of a moveable object (e.g. helmet or aircraft), the origin O and direction of the axes being defined typically according to mechanical criteria;

+x is a forward direction;
+y is to the right;
+z is downwards;
+$\psi$ is a clockwise rotation ('yaw') about the +z direction;
+$\theta$ is a clockwise rotation ('pitch') about the +y direction;
+$\varphi$ is a clockwise rotation ('roll') about the +x direction.

For convenience, the orientation of a tracked object or helmet and the orientation of a moveable platform or aircraft, relative to a given frame of reference, will be defined using quaternions.

In a typical head or helmet-mounted display system, a waveguide display or a visor projection display arrangement is provided; generating images visible to one or both eyes of a user. The images are typically in the form of symbols or other display artefacts, displayed so as to appear overlain on an external scene viewable through the otherwise transparent waveguide or visor, the waveguide or visor acting as a combiner. The symbols or other display artefacts may include anything from monochrome symbols in a predetermined symbology set, data or other text information through to full colour video imagery or a view provided of the external scene by a night vision camera during night-time use.

There are two particular situations in which helmet orientation needs to be taken into account when positioning symbols within a helmet-mounted display: display of symbols of a virtual head-up display, geometrically aligned to a centre line of the aircraft; and display of symbols such that they appear in fixed alignment with a ground-based object or other object in a fixed position relative to the Earth, viewable outside the aircraft. In each case the orientation of one or both of the helmet relative to the aircraft and the aircraft relative to the Earth may be changing, the former potentially rapidly.

Various different head or helmet tracking systems are known based upon inertial sensor technologies, non-inertial sensor technologies or a mixture of inertial and non-inertial sensor technologies. For example, in a helmet tracker system for use in an aircraft or other type of enclosed space, an optical tracker system may be used comprising a fixed arrangement of infra-red light-emitting diodes (LEDs) mounted on the helmet and an array of cameras mounted at known positions in a surrounding cockpit or cabin. Helmet orientation may be tracked by energising the LEDs in controlled patterns in a regular pulse cycle and processing the camera images of the helmet LEDs. Each pulse cycle provides an independent opportunity to determine helmet orientation.

It is also known to use an electro-magnetic tracker arrangement or an acoustic tracker arrangement in such confined spaces comprising a combination of sensors and transmitters, with the transmitters mounted on the helmet and the sensors at fixed positions within the space, or vice versa.

One disadvantage of optical or equivalent non-inertial tracker systems when used with display systems is an inherent latency in determining updates to helmet orientation. This latency may be compounded with any inherent latency in adjusting symbol positions in an associated display system such that the overall system response to determined changes to helmet orientation can cause pilot nausea. This occurs when movements of the head do not result in substantially simultaneous and corresponding movements in displayed symbols intended to appear fixed to some external reference point. Attempts to minimise latency in such applications have led to the use of miniature inertial sensors, be they accelerometers, tilt sensors or miniature gyroscopic sensors, small enough to be mounted on the helmet with two or three such sensors being aligned with respective orthogonal axes ('gyro axes'). Inertial sensors are capable of producing data indicative of a rate of change of orientation more quickly than optical, magnetic or acoustic sensors, for example, are capable of indicating a change in orientation. However, miniature inertial sensors of a type suitable for helmet-mounting may output orientation rate data that is prone to varying bias errors, noise or other types of 'installation' or 'misalignment' error, for example arising from imprecise mounting on the helmet and non-orthogonality of the gyro axes from manufacture.

It is known to combine inertial sensors on the helmet with a non-inertial helmet orientation sensor system and to combine data from the two sources in a process to calculate and to apply corrections to the inertial sensor rate data. This helps to prevent the accumulation of errors when calculating helmet orientation from the inertial sensor measurements.

In the present invention a hybrid helmet tracker system has been devised that is particularly suited for use with helmet-mounted display systems, addressing the problems both in data quality from the helmet movement sensor systems and latency in the associated display system. The hybrid tracker system of the present invention combines inertial sensors mounted on the helmet with an optical helmet tracker system. A number of processing components are provided to process the data output from those sources in a novel and inventive way to determine helmet orientation relative to the inertial reference frame, or 'World axes', and helmet orientation relative to a moveable reference frame, such as an aircraft or other type of land or sea vehicle that the user may be piloting or in which the user may otherwise be riding. Moreover, helmet orientation is determined in such a way as substantially to eliminate delay in adjusting the position of displayed imagery in an associated helmet-mounted display system when responding to changes to helmet orientation.

In the description that follows, data variables will be named according to the naming structure <Treatment><Tracked Frame><Data Type>$_{<Data\ Source>}$<Reference Frame> in which:

<Treatment> defines any pre-processing applied to the data, in particular
- 'f'—indicates the data are filtered, using a known or specified filtering technique, and
- 'i'—indicates that the data comprise an interpolated value derived from two consecutive measures of the respective variable;

<Tracked Frame> comprises an upper case letter designating the frame of axes being tracked and to which the data relates, including
- 'H'—Helmet Shell (helmet-referenced axes),
- 'G'—Helmet-mounted Gyros (gyro axes), and
- 'A'—Aircraft (aircraft-referenced axes);

<Data Type> is used to designate data defining a 'Rate' of change, as applicable;

<Data Source> is a lower case letter, as a subscript, defining the most recent origin of the data, i.e. the sensor system or processing stage from where the data were generated, including
- 'o'—Optical Helmet Tracker,
- 'g'—Helmet-mounted Gyros, and
- 'c' gyro data Corrector; and <Reference Frame> defines the frame of reference relative to which the data define the orientation of the Tracked Frame, including
- 'W'—axes of the inertial frame of reference, also referred to as 'World axes' or 'inertial space', and
- 'A'—axes fixed to the Aircraft.

Overview of Core Components

Core components and functionality of an example embodiment of the hybrid helmet tracker system of the present invention will now be described in outline with reference to FIG. 1. For convenience, orientation of a tracked entity with respect to defined axes will be expressed as a quaternion, unless otherwise specified.

Referring to FIG. 1, a logical architecture depicts, from a functional perspective, a set of core components of the hybrid helmet tracker system 1 of the present invention for determining helmet orientation relative to a host aircraft. In such an application, the hybrid helmet tracker system 1 makes use of sensor data from three sources.

An arrangement of helmet-mounted inertial sensors—Helmet-mounted Gyros 5—comprising three miniature gyroscopes (gyros), e.g. microelectromechanical systems (MEMS) gyros, each associated with a respective one of three nominally orthogonal gyro axes. Each gyro is able to sense a rate of change in orientation of the system of Helmet-mounted Gyros 5 in inertial space, resolved along its respective gyro axis. The system 5 generates rate vectors GRate$_g$ at a frequency of several kilohertz, whose components define the rate of change in orientation of the gyro system 5 sensed by the individual gyros about their respective gyro axes.

An Optical Helmet Tracker system 10 including components mounted on the helmet and in the cockpit of an aircraft to determine orientation of the helmet H$_o$A, i.e. orientation of a set of helmet-referenced axes relative to aircraft axes, and to output data indicative of a determined helmet orientation, typically at a frequency of 180 Hz.

An Aircraft Navigation System 15, though not a component of the hybrid helmet tracker 1 of the present invention, typically based upon an inertial sensor system using laser gyroscopes. The Aircraft Navigation System 15 outputs data, from time to time (typically once every 20 ms to 90 ms), defining orientation of the aircraft, specifically of a set of aircraft-referenced axes, relative to a navigation frame of reference, typically a 'local level north' pointing frame of reference. For the purposes of the present invention, aircraft orientation data output by the Aircraft Navigation System 15 may be received by the hybrid helmet tracker 1 and used as a measure of aircraft orientation AW relative to the inertial reference frame. Variations in the alignment of the navigation frame and the inertial reference frame due Earth rotation and movement of the aircraft over the ground may be validly ignored over the time periods during which these data are used in the present invention, as will become clear from the description that follows.

A typical Aircraft Navigation System 15 has an interface to and outputs data over a standard data bus, one example being MIL-STD-1553B, provided within the aircraft. The Aircraft Navigation System 15 outputs an updated measure of aircraft orientation AW over the data bus so that it may be received by whichever of the installed aircraft systems require it. The hybrid helmet tracker 1, in particular, may be linked to the standard data bus so that it may also receive updated aircraft orientation data from the Aircraft Navigation System 15. However, as an alternative source of data defining aircraft orientation relative to the inertial reference frame, an inertial or other type of sensor arrangement able to determine aircraft orientation in inertial space may be mounted within the aircraft for use by the hybrid tracker system 1.

In example embodiments of the present invention, helmet orientation is determined on a cyclic basis, corresponding to a need to reposition certain types of symbol, according to changing helmet orientation, being displayed in an associated digital helmet-mounted display. During each cycle—to be referred to as a 'tracker cycle'—helmet orientation is determined from data supplied by the Helmet-mounted Gyros 5, any errors in those inertial sensor data being firstly corrected with reference to data supplied by the Optical Helmet Tracker 10 in combination with aircraft orientation data received over the data bus. Conveniently, the duration of a tracker cycle may be arranged to match the period between successive image refreshes in the associated digital display, although this is not essential.

In embodiments of the present invention, when calculating corrections to inertial sensor data, for example, it has been found convenient to work with data defining orientation of a helmet as sensed by the different associated sensor systems (5, 10) referenced to a common frame of reference—to the inertial frame of reference, also referred to herein as 'inertial space' or 'World axes'. Data output by the Helmet-mounted Gyros 5 relate to motion of the gyros in inertial space whereas data output by the Optical Helmet Tracker 10 define motion of the helmet relative to a frame of reference fixed to the aircraft. It is therefore desirable to relate aircraft-referenced data from the Optical Helmet Tracker 10 to inertial space. With this objective in mind, a Transform component 20 is provided to receive a measure of helmet orientation $H_oA$ relative to the aircraft from the Optical Helmet Tracker 10 expressed as a quaternion and to transform it by quaternion multiplication into a derived helmet orientation $$H_oW = AW \times H_oA \qquad (1)$$

relative to the inertial reference frame using the aircraft orientation AW received over the standard bus from the Aircraft Navigation System 15. If the Optical Helmet Tracker 10 uses a different convention for defining orientation to that used by the Aircraft Navigation System 15 or by the system of Helmet—mounted Gyros 5, then the Transform component 20 is also arranged to convert the output of the Optical Helmet Tracker 10 so as to express helmet orientation using the same convention as used by the other two sensor systems 5, 15.

As a further convenience, for the purposes of subsequent data processing combining rate-of-change data from the Helmet-mounted Gyros 5 with data from the Optical Helmet Tracker 10, a Calculate Rate component 25 is provided to 'differentiate' the optically-sensed orientation measurements $H_oW$ to provide a rate of change of orientation vector $HRate_o$, over a predetermined time interval, representing a point in a 'derive object orientation rate space' or, in the case of a helmet tracker, a 'derived helmet orientation rate space'. That is, the components of a rate vector $HRate_o$ define the derived optically-sensed rates of change in helmet orientation in inertial space resolved along the object-referenced or helmet-referenced axes.

In an ideal arrangement, the axes of the Helmet-mounted Gyros 3 are substantially aligned with the helmet-referenced axes. However, in practice, there are likely to be differences in alignment or other installation-related or manufacturing errors. The present invention is able to detect the effects of such errors in the rate data output by the Helmet-mounted Gyros 5 and so determine corrections required to compensate for such errors with a configurable level of authority. That is, various configurable processes operate, as will be described below, to determine when and to what extent determined corrections may be applied to rate data being output by the Helmet-mounted Gyros 5.

Besides errors arising during installation or manufacture, rate data output by miniature gyros of a type suitable for helmet mounting may be subject to 'noise', characterised by the distribution in rate measurements output over a series of rate vectors $GRate_g$ for a given helmet movement, or even when the gyros are stationary. More significantly, rate data output from individual gyros are also likely to include bias errors, typically of the order of 0.1°/min or more, which may also change, for example with varying temperature of the gyros, causing accumulating errors in determined orientation of the helmet if not corrected for.

For these reasons it is also known to include a non-inertial sensor arrangement—in example embodiments of the present invention the Optical Helmet Tracker 10 provides such a non-inertial sensor arrangement—to provide data from which corrections to gyro rate data may be calculated by an innovative technique, to be described in detail below. By this technique, the calculation of corrections for errors arising during installation or manufacture may be carried out separately, and potentially only once, from the calculation of corrections for bias.

To ensure that the data used to calculate gyro data corrections are relatively noise-free, recognising that a rate of change in orientation derived from measurements by the Optical Helmet Tracker 10 may also be subject to noise effects, the inventors have provided additional data filtering components, as will be discussed in more detail below, to reduce the effects of noise in data from the two helmet orientation sensor systems 5, 10. In particular, to help counter the effects of noise in the rate data output from the Helmet Mounted Gyros 5, multiple readings of $GRate_g$ rate data are received from the Helmet-mounted Gyros 5 over a predetermined sampling period during each tracker cycle and an average rate vector GRate is calculated, representative of the sample.

A processing component—Calculate Gyro Corrections 30—is provided to receive filtered $HRate_o$ rate vectors and the corresponding GRate gyro rate vectors from the Helmet-mounted Gyros 5 and to determine any installation or manufacturing-related errors in the gyro rate data. Specifically, such errors may include: errors in alignment of the gyro axes with the helmet-referenced axes during installation of the Helmet-mounted Gyro system 5 upon a helmet; errors due to non-orthogonality of the gyro axes; and errors due to relative scaling of rate measurements along the gyro axes. The Calculate Gyro Corrections component 30 is then able to calculate a correction to compensate for such misalignment, non-orthogonality or scaling errors and thereby relate the movement sensed by the gyro system 5 more accurately to the actual movement of the helmet.

The determined correction is then applied for that tracker cycle by an Apply Gyro Corrections component 35 to the rate vector GRate derived from a respective sample of rate vectors $GRate_g$ output from the Helmet-mounted Gyros 5.

If it is decided that errors arising from installation or manufacture are unlikely to change over time, then the correction to be applied by the Apply Gyro Corrections component 35 may be determined once, for example during an initial helmet display system configuration step, and not thereafter updated. The determined correction may be stored in or in association with the particular helmet and its associated display system, to be retrieved and applied by the Apply Gyro Corrections component 35 during subsequent operation of the helmet display system 1.

To correct for gyro bias, the determined correction is also applied by the Calculate Gyro Corrections component 30 to a (potentially more recent) filtered GRate vector which is then passed to another processing component—Calculate Gyro Bias 40—along with a suitably filtered and synchronised rate vector HRate$_o$ applicable to the same period of helmet movement, for the calculation of a gyro bias correction. Alternatively, the correction calculated by the Calculate Gyro Corrections component 30 (or otherwise) may be passed to the Calculate Gyro Bias component 40 along with the filtered GRate vector for the correction to be applied, for example if the Calculate Gyro Corrections component 30 has been disabled. The calculated bias correction is added by a summing component 45 to the corrected GRate vector output by the Apply Gyro Corrections component 35 to result in a fully corrected measure of the rate of change in orientation of the helmet as sensed by the Helmet-mounted Gyros 5, expressed as a vector HRate$_c$. The fully corrected rate vector HRate$_c$ represents a point in the 'derived helmet orientation rate space', i.e. a vector whose components define a rate of change of helmet orientation in inertial space, resolved along the helmet-referenced axes.

By fully correcting rate data received from the Helmet-mounted Gyros 5, the benefit of higher expected rate of availability of data from Helmet-mounted Gyros 5 may be exploited with minimal loss of accuracy as compared with the typically slower rate of availability of data from certain types of non-inertial tracker system, such as the Optical Helmet Tracker 10.

Having applied (35, 45) corrections to the latest inertial sensor data to result in the fully corrected rate vector HRate$_c$, a measure of helmet orientation HW relative to the inertial frame of reference, or World axes, is determined by integration in an Integrator component 50. The derived helmet orientation H$_o$W with respect to the inertial frame of reference, output by the Transform component 20, is supplied to the Integrator component 50 for use ('NULL') in correcting an integration error by a process also to be described in detail below.

A Predictor component 55 is provided to determine how the helmet orientation may have changed relative to the inertial frame of reference over a predetermined time period into the future—a Prediction Time period T$_p$—from the time of validity of the orientation HW determined by the Integrator 50. That time of validity is a time point of validity of the GRate vector for the tracker cycle. The Predictor component 55 receives the corrected rate data HRate$_c$ and applies a prediction technique, to be described in more detail below, to determine the change in helmet orientation over the Prediction Time Period T$_p$ taking account of a configurable length of recent history of helmet movement. The change determined by the Predictor component 55 is added in a summing component 60 to the orientation HW to give a predicted orientation H$_p$W for the helmet relative to World axes.

A particular benefit of including the Predictor component 55 in the helmet tracker 1 of the present invention is an ability to anticipate the total latency in a process that begins with the capture of data from the Helmet-mounted Gyros 5, indicative of a movement of the helmet, and ends with the display of a repositioned symbol by an associated helmet-mounted display system. The Predictor Component 55 enables the symbol to be repositioned in the display to take account of a helmet orientation expected by the time the repositioned symbol becomes viewable in the display by the pilot—the end of the Prediction Time period T$_p$.

The Integrator component 50 may be implemented separately from the Predictor component 55, or the Integrator component 50 may be incorporated as part of the functionality of the Predictor component 55, as convenient.

The display system may use the predicted helmet orientation H$_p$W relative to World axes to position symbols in the display that are intended to be aligned with particular ground-referenced features or positions in an external scene visible to the pilot at that time through the display. However, to be able to reposition symbols in a virtual head-up display (HUD) fixed in space relative to the pilot's view (subject to parallax) of the interior of the aircraft (i.e. relative to aircraft axes), a further Transform component 65 is provided to transform the predicted orientation H$_p$W relative to World axes into a predicted helmet orientation H$_p$A relative to the aircraft-referenced axes using the latest measure of aircraft orientation AW as supplied over the standard aircraft data bus by the Aircraft Navigation System 15. Any expected latency in the output of updates to aircraft orientation AW by the Aircraft Navigation System 15 has been found unlikely to have a significant effect on the accuracy of the predicted helmet orientation H$_p$A relative to the aircraft-referenced axes.

The tracker cycle period of the hybrid helmet tracker system 1 is selected, conveniently, to support the needs of the associated display system or other user of the determined helmet orientation data. In the particular example of a digital helmet-mounted display system, it is desirable to be able to update the position of symbols in the display within a time period of no more than 20 ms, but in practice a shorter period is desirable, enabling not only a more rapid update to displayed information but also to a corresponding reduction in the Prediction Time period T$_p$.

As a further convenience, the tracker cycle period may be selected to correspond to the period between successive measurements of helmet orientation by the Optical Helmet Tracker 10, 5.555 ms in the example mentioned above, being generally less responsive to helmet movement than the Helmet-mounted Gyros 5. However, as mentioned above, the tracker cycle period need not necessarily be linked to the performance of the Optical Helmet Tracker 10. In an alternative arrangement, the rate at which data output by the Helmet-mounted Gyros 5 are sampled may be set to be a multiple of the rate at which data are available from the Optical Helmet Tacker 10, enabling a corresponding reduction in the tracker cycle period.

In a particular embodiment, data output from the Helmet-mounted Gyros 5 may be sampled at 180 Hz, for example, and the Optical Helmet Tracker 10 may be operated at a slower rate, for example at 60 Hz—a period of 16.667 ms between successive measurements. For convenience, the tracker cycle rate (the rate at which gyro data are sampled) should be a predetermined multiple of the rate at which the Optical Helmet Tracker 10 is operated.

There are at least two potential advantages of operating the Optical Helmet Tracker 10 at a slower rate than the tracker cycle rate. Firstly, the power of light signals emitted by the Optical Helmet Tracker 10 may be reduced, with consequent savings in power consumption. Secondly, such light signals may be rendered less easily detectable by external agencies, particularly during night-time operation.

It is generally preferred that the tracker cycle of the hybrid helmet tracker 1 is synchronised to the display cycle of the associated display system. If, for any reason, the display cycle is not always synchronised to the tracker cycle, a hardware or software-implemented component may be included at an output of the hybrid helmet tracker system 1 to interpolate one or both of the outputs $H_pW$ and $H_pA$ over successive tracker cycles to determine helmet orientation at some other time point appropriate to the needs of the display system. This ensures that the Predictor 55 is able to operate to a stable Prediction Time $T_p$.

For any given tracker cycle, a sample of rate data from the Helmet-mounted Gyros 5 provides a measure GRate of rate data that is then fully corrected (35, 45) using the latest calculated corrections for errors. The Integrator 50 and Predictor 55 use the corrected rate data $HRate_c$ to determine predicted measures $H_pW$ and $H_pA$ of helmet orientation for that tracker cycle. However, the processes for updating the corrections for errors, calculated by the Calculate Gyro Corrections component 30 and the Calculate Gyro Bias component 40, may operate over a different cycle—a 'corrections update cycle'—for convenience, corresponding to the rate at which the Optical Helmet Tracker 10 is operated and so the rate at which new data become available for such calculations.

In describing an example embodiment of the present invention, it will be assumed that the Optical Helmet Tracker 10 is operated at the tracker cycle rate and that data from the helmet orientation sensors 5, 10 are available to the correction calculation components 30, 40 at the tracker cycle rate. Variations in operation of various components of the hybrid helmet tracker 1 to enable the Optical Helmet Tracker 10 to be operated at a different rate to the tracker cycle rate will be discussed later.

During each 'corrections update cycle', the Calculate Gyro Corrections component 30, in particular, receives the most recently generated one or more GRate vectors and determines their suitability for use in a new calculation of 'misalignment' error and of its correction, as will be discussed in more detail below. A new calculation of the correction is triggered each time suitable GRate data become available, but the time period between successive arrivals of suitable data may in principle extend to any variable number of corrections update cycles, and hence of tracker cycles. During such periods the Apply Gyro Corrections component 35 may need to apply the same correction for each of those tracker cycles pending calculation of an update. However, an alert may optionally be triggered when this duration reaches a configurable time limit to guard against the display of misleading information.

It is also possible that, from time to time, output from the Optical Helmet Tracker 10 will be temporarily unavailable, for example when light signals passing between the helmet-mounted LEDs and the cockpit-mounted sensors are temporarily blocked by pilot hand movement or otherwise. In such a situation, operation of the helmet tracker process may enter a so-called 'coasting' period during which operation of the Calculate Gyro Corrections component 30 and Calculate Gyro Bias component 40 are suspended—there being no new data from the Optical Helmet Tracker 10 on which to base correction calculations. In this situation too, the correction being applied to GRate data by the Apply Gyro Corrections component 35 and the correction for gyro bias being applied by the summing component 45 over the affected tracker cycles remain unchanged until data from the Optical Helmet Tracker 10 next becomes available and the corrections update cycle may restart. A coasting period may last for one or more tracker cycles, limited by a configurable maximum coasting period to ensure that errors, in particular those due to gyro bias, don't accumulate to unusable levels.

Synchronisation and Filtering

As mentioned above, it is convenient, though not essential, to operate a corrections update cycle at the same rate as the tracker cycle rate. It is also convenient, though not essential, to operate the Optical Helmet Tracker 10 at the tracker cycle rate, the tracker cycle rate being thereby limited to a frequency of 180 Hz, in this example. The rate at which the Optical Helmet Tracker 10 is able to measure changes in helmet orientation would be considered sufficiently rapid to support the needs of an associated helmet-mounted display in repositioning symbols in the display and so, for the purposes of explaining the principles, the following section of description will assume these convenient choices for equalising the correction cycle, tracker cycle and Optical Helmet Tracker rates. These choices are illustrated in FIG. 2 in two views of a tracker cycle time line: FIG. 2a showing the tracker cycle periods for the helmet tracker 1 and hence the periods over which the Predictor 55 operates to determine predicted helmet orientation; and FIG. 2b relating to the corrections update cycle for the calculation of corrections to gyro rate data by the Calculate Gyro Corrections component 30 and the Calculate Gyro Bias component 40.

Referring to FIG. 1 and additionally to FIG. 2a, a time line is shown spanning two complete tracker cycles, n−1 and n, of duration 5.555 ms, beginning at time points Sync(n−1) and Sync(n), respectively. A samples of $GRate_g$ vectors may be captured from the Helmet-mounted Gyros 5 over sampling periods 85 extending over substantially the full duration of each tracker cycle, between time points Sync(n−1) and tGRate(n−1), Sync(n) and tGRate(n), etc.

For the purposes of deriving a predicted helmet orientation $H_pA$ and $H_pW$ in respect of tracker cycle n for example, the most recently available fully corrected gyro rate vector $HRate_c$ is that calculated based upon a sample of $GRate_g$ vectors captured during the capture period 85 beginning at the time point Sync(n−1) and ending at the time point tGRate(n−1). For the next complete tracker cycle, $HRate_c$ is calculated based upon a sample of $GRate_g$ vectors captured during the capture period 85 beginning at the time point Sync(n) and ending at the time point tGRate(n). For the purposes of predicting helmet orientation by the Predictor 55 during tracker cycle n, the time point of validity of the most recently available sample of rate data from the Helmet-mounted Gyros 5 is the time point tGRate(n−1) at the end of the previous tracker cycle.

Updates to helmet orientation are determined in the Optical Helmet Tracker 10 using regular sets of pulses of infrared light emitted by light-emitting diodes (LEDs), each set of pulses occurring within a short time interval 80 near to the start of each tracker cycle (these pulses would only occur at the beginning of one tracker cycle in every T tracker cycles if the tracker cycle rate was T-times as fast as the Optical Helmet Tracker rate). Each set of LED pulses provides an opportunity to determine helmet orientation and therefore represents a point in time at which a respective determination of helmet orientation $H_oA$ would be considered valid. In FIG. 2a, the labels tmHA(n−1) and tmHA(n) represent the nominal points in time at which an optically-tracked helmet orientation is valid in respect of LED pulses generated during the cycles n−1 and n respectively. As mentioned above and to be described in detail below, the helmet orientation $H_oW$, derived from $H_oA$ and a corresponding synchronised measure AW of aircraft orientation, is used in a process to null an error of integration by the Integrator component 50.

For the purposes of nulling an error of integration, the helmet orientation $H_oW$ should be synchronised to the end of a tracker cycle to match the assumed time points of validity tGRate(n−1), tGRate(n), etc. of the gyro rate data. Given that the Optical Helmet Tracker 10 is only able to determine helmet orientation as it would apply for a tracker cycle n−1 after the set of LED pulses at the time point tmHA(n) during the tracker cycle n, the Transform component 20 may be arranged to derive helmet orientation relative to World axes $H_oW$ for the time point tGRate(n−1) by interpolation between the two measures of helmet orientation $H_oW$ determined in respect of the time points tmHA(n−1) and tmHA(n) to give an interpolated estimate $iH_oW$ of the helmet orientation valid at the end of the tracker cycle n−1. The interpolation step has the effect of delaying the determination of $H_oW$ applicable in respect of tracker cycle n−1 by the time period tmHA(n)−tGRate(n−1).

That is, for the purpose of correcting an integration error during a tracker cycle n, the time point of validity of the most recently available measure $H_oW$ is an interpolated measure, $iH_oW$, valid at the time point tGRate(n−1), or at the equivalent time point tGRate( ) during an earlier tracker cycle, rather than the measure $H_oW$ generated in respect of the most recent LED pulses at the time point tmHA(n). Availability of a suitably timed measure AW of aircraft orientation in inertial space is required to generate each measure $H_oW$, as will be discussed below, such that the most recently available combination of synchronised outputs of helmet orientation $H_oA$ from the Optical Helmet Tracker 10 and AW from the Aircraft Navigation System 15 may relate to an earlier tracker cycle than the cycle n−1.

The chosen convention of working with data timed to the end of a tracker cycle is taken into account when determining the Prediction time period $T_p$ to be applied by the Predictor component 55 so that the Prediction Time period $T_p$ is defined relative to the end of the tracker cycle of the latest processed gyro data—the time point of validity of the most recently available integrated helmet orientation HW.

Referring to FIG. 1 and additionally to FIG. 2b, a similar time line is shown as for FIG. 2a, showing the main time points relevant to the calculation of corrections for installation or manufacturing-related errors by the Calculate Gyro Corrections component 30 and the calculation of updates to gyro bias corrections by the Calculate Gyro Bias component 40 during two corrections update cycles m−1 and m, in this example having the same period—5.555 ms—as the chosen tracker cycle period shown in FIG. 2a. For the purposes of calculating and updating corrections by the Calculate Gyro Corrections component 30 and/or by the Calculate Gyro Bias component 40, the synchronisation requirements are slightly different to those discussed above for the Integrator 50 and Predictor 55 components.

In particular, calculations of gyro error corrections by the components 30, 40 require, as input, filtered orientation rate data $HRate_o$, derived (25) using successive measures $H_oW$ of orientation data output by the Optical Helmet Tracker 10, substantially synchronised with filtered GRate data captured from the Helmet-mounted Gyros 5, so ensuring that the two input measures relate to the same period of helmet movement. Those data forming an input to the correction calculation components 30, 40 do not necessarily relate to the 'current' tracker cycle during which a fully corrected rate vector $HRate_c$ is to be generated, but they do need to be synchronised with each other. Furthermore, aircraft orientation data AW output by the Aircraft Navigation System 15 and used to derive the helmet orientation $H_oW$ should also be valid at the time of validity of the helmet orientation data $H_oA$ output by the Optical Helmet Tracker 10, i.e. at respective time points $H_oA$(m−1), $H_oA$(m), etc.

Rate of change data $HRate_o$ derived by the Calculate Rate component 25 are based upon the change in helmet orientation $H_oW$ in inertial space derived from successive synchronised pairs of measures of $H_oA$ and AW, valid at the time points $H_oA$(m−1), $H_oA$(m) for example. The derived rate $HRate_o$ is assumed valid at a time point $HRate_o$(m−1) mid-way between the time points $HRate_o$(m−1), $H_oA$(m) of the respective pair; $HRate_o$(m) being the time of validity of the rate vector $HRate_o$ derived during the next corrections update cycle.

As mentioned above, a first simple type of filtering (by determining an average) is applied to each sample of the raw gyro rate data $GRate_g$ captured over a respective sample period 85. The average gyro rate vector GRate is assumed valid, for the purposes of calculating error corrections, at a time point GRate(m−1), GRate(m), etc. midway through the respective sample period 85. As can be seen in FIG. 2b, the points of validity GRate(m−1) and $HRate_o$(m−1), GRate(m) and $HRate_o$(m) are not exactly aligned, but they are considered sufficiently close in time within their respective cycles to be synchronised.

To achieve these various correlation and synchronisation requirements, additional functional components may be incorporated into the logical architecture of FIG. 1, as will now be described with reference to FIG. 3 in another example embodiment of the present invention.

Figure 3:
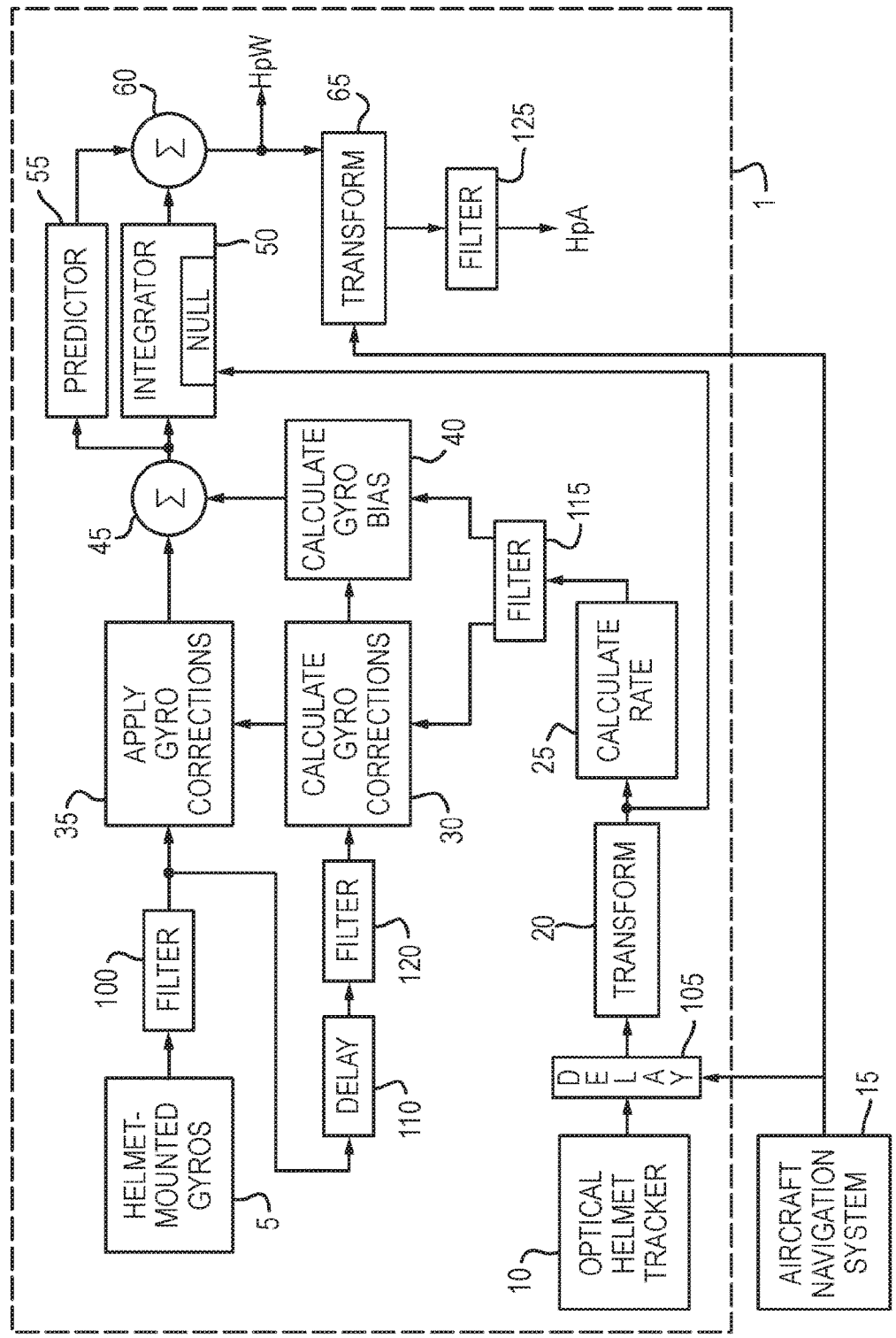
FIG. 3 depicts an enhanced functional architecture for a helmet tracker system according to an example embodiment of the present invention.

Referring to FIG. 2 and additionally to FIG. 3, a logical architecture depicts, from a functional perspective, the set of core components of the hybrid helmet tracker system 1 as shown in FIG. 1 using the same reference numerals, together with additional functional components for pre-processing, filtering and synchronising data, ensuring that noise-reduced data sources and tracker functions are synchronised according to the principles outlined above.

As mentioned above, a first simple type of filtering is applied to the sample of rate vectors $GRate_g$ to reduce noise. A Filter component 100 is therefore provided at the output from the Helmet-mounted Gyros 5 to capture a sample of $GRate_g$ rate data over the predetermined time interval 85 and to calculate a respective average rate vector GRate for the sample.

Additional functionality may be provided to ensure that the derived helmet orientation $H_oW$ relative to World axes is calculated using measures of helmet orientation $H_oA$ relative to the aircraft and aircraft orientation AW relative to World axes that are correctly synchronised. The additional functionality takes account of the possibility that an update to the aircraft orientation data AW is not necessarily made available by the Aircraft Navigation System 15 at a sufficiently high rate to be available to combine with every measure $H_oA$ output by the Optical Helmet Tracker 10, i.e. every 5.555 ms in the current example embodiment. An update to AW may be available from the Aircraft Navigation System 15 every 20 ms-90 ms, for example. The additional functionality may achieve synchronisation of $H_oA$ data with AW data using a two part procedure: (1) selecting a most recent corrections update cycle during which a time point of validity $H_oA$( ) of optically-tracker helmet orientation $H_oA$ lies between the time points of validity of two consecutive measures of aircraft orientation AW data by the Aircraft Navigation System 15, the selected corrections update cycle corresponding to a cycle that precedes the a recently complete corrections update cycle by d cycles; and (2) selecting the two consecutive measures of AW and interpolating between them to calculate an estimate of aircraft orientation at the time point of validity of $H_oA$ for the selected corrections update cycle. This two part procedure may be implemented by a Delay/Synchronisation component 105 inserted between the Optical Helmet Tracker 10 and the Transform component 20.

In selecting the most appropriate corrections update cycle in part (1) of the procedure, the Delay component 105 retains a history of aircraft orientation updates AW and finds two of them in that retained history whose times of validity surround the time point of validity $H_oA(\ )$ of the delayed optically-tracked result $H_oA$. If it cannot achieve this consistently, it may gradually adjust the corrections update cycle delay d until it is able to place a delayed optically-tracked result $H_oA$ reliably between the times of validity of two consecutive outputs of aircraft orientation AW. The delay d of the delayed optically-tracked result $H_oA$ indicates the reference corrections update cycle for selection of a synchronised GRate vector from the Helmet-mounted Gyros 5 for the purposes of calculating gyro corrections (30, 40).

Another way in which $H_oA$ data may be synchronised with AW data is to include a further Predictor component (not shown in FIG. 3) between the Aircraft Navigation System 15 and the Transform component 20, to forward-predict from the most recently available measures of aircraft orientation AW, an estimate of the aircraft orientation at a time point $H_oA(\ )$ at the beginning of a current corrections update cycle. This approach enables a most recently determined helmet orientation data $H_oA$ to be used without delay. If the Aircraft Navigation System 15 is able to output rate data defining the rate of change of aircraft orientation, such data may be used by the further Predictor component to implement this forward prediction step.

In deriving a rate of change in helmet orientation vector $HRate_o$ applicable to a delayed corrections update cycle m, the Calculate Rate component 25 uses the two preceding outputs of helmet orientation $H_oW$ relative to World axes from the Transform component 20 which, in respect of delayed corrections update cycle m, are those synchronised to the end of corrections update cycles m−1 and m−2.

To ensure that GRate data are supplied to the Calculate Gyro Corrections component 30 substantially synchronised with rate data generated (25) using data that has been selected/delayed by the Delay/Synchronisation component 105, a corresponding Delay component 110 is inserted between the Filter component 100 and the Calculate Gyro Corrections component 30 to apply the same delay d (or an equivalent time period if the tracker cycle period is shorter than the corrections update cycle period) to filtered GRate data. In a typical implementation, the delay d being applied by the Delay components 105, 110 is achieved by selecting corresponding pairs of filtered GRate and $HRate_o$ vectors from respective buffers.

A further type of filtering may be applied to both the delayed GRate vectors and to the delayed rate of change of orientation vectors $HRate_o$ derived by the Calculate Rate component 25 to reduce noise in the respective rata data. A Filter component 115 is provided to receive the $HRate_o$ vectors from the Calculate Rate component 25 and to implement a conventional Finite Impulse Response (FIR) filter with half-sine-wave weighting, for example, maintaining a history of $HRate_o$ vectors calculated over recent corrections update cycles and applying the half-sine-wave weighting to the relative contribution by a currently calculated rate vector $HRate_o$ and the historical vectors to result in a filtered rate vector $fHRate_o$. The filtered rate vector $fHRate_o$ is made available to the Calculate Gyro Corrections component 30 and to the Calculate Gyro Bias component 40. An equivalent Filter component 120 is provided to carry out substantially the same processing as the Filter component 115 upon the GRate vectors being output from the first stage Filter component 100 and the Delay component 110. The resultant filtered rate vector fGRate is passed forward to the Calculate Gyro Corrections component 30. As an alternative to a FIR filter, an Infinite Impulse Response (IIR) filter may be implemented by each of the Filter components 115, 120 with the benefit of reduced data processing requirements.

A final stage of filtering may be applied in a Filter component 125 to the predicted helmet orientation $H_pA$ with respect to aircraft axes output by the Transform component 65. This final stage of filtering may be achieved in a low-pass filter with adjustable latency, for example a Hanning FIR filter. The principles of operation and benefits of the Filter component 125 will be described in more detail below.

Calculation of Gyro Rate Data Corrections

In an ideal installation of the Helmet-mounted Gyros 5 upon a helmet, the axes of the gyros should be perfectly orthogonal and aligned with the helmet-referenced axes used by the Optical Helmet Tracker 10. However, in practice that ideal installation is not achieved. The Calculate Gyro Corrections component 30 operates over a number of corrections update cycles which, as discussed above, may be of the same duration as the tracker cycle period or some predetermined multiple thereof, to gather data from the helmet orientation sensors 5, 10 and to calculate corrections which may be applied (35) to the latest GRate data in a current tracker cycle and so simulate the ideal gyro installation.

The Calculate Gyro Bias component 40 uses the calculated correction by the Calculate Gyro Corrections component 30 in a method for calculating an adjustment for the latest gyro bias to be added (45) to the corrected GRate vector in the current tracker cycle.

An example inventive method for determining the corrections to be applied will now be described according to an example embodiment of the present invention. Whereas the method to be described is being applied in the context of a helmet tracker operating on a moveable platform, it will be apparent to a person of ordinary skill in the field of tracker technology that the cyclic method of gyro correction to be described below may be applied to the determination of corrections to data output by any inertial sensor system in respect of an object, making use of orientation rate of change data derivable from another sensor system associated with the object, whether inertial or non-inertial, able to provide a corresponding cyclic indication of rate of change in orientation of the object in inertial space.

The method implemented by the Calculate Gyro Corrections component 30 is based upon the assembly and maintenance, over a number of corrections update cycles of a sample set of delayed (110) and filtered (120) gyro rate data fGRate, satisfying predetermined selection criteria, from which an accurate assessment of the extent of non-orthogonality of the gyro axes and their misalignment relative to the helmet-referenced axes of the Optical Helmet Tracker 10 may be determined. Calculation of a correction, or an update to a correction, is triggered by the assembly of, or an update to, the sample set.

The calculated correction comprises a mapping of vectors linking an arrangement points in gyro rate space represented by the assembled set of gyro rate vectors fGRate onto a corresponding set of vectors linking a corresponding arrangement of points represented by rate vectors fHRate$_o$ in the derived helmet orientation rate space. A key benefit in this approach is the ability, in a single mapping, to compensate for the effects of a rotational misalignment of the gyro axes, any non-orthogonality of the gyro axes and relative scaling by the gyro axes. Furthermore, by this method, the calculation of corrections for such installation or manufacturing-related defects may be determined separately from the corrections for bias, and potentially only once for a given hybrid helmet tracker 1.

This capability for dynamically correcting for a potentially changing misalignment error is of particular benefit in a wider range of applications where miniature gyros are being used under conditions where the gyro alignment might change during use with respect to a reference alignment, for example due to an impact or insufficiently rigid mounting of the gyros relative to a reference frame of the object. In such a case, the Calculate Gyro Corrections component 30 may be operated continuously.

The sample set is assembled from data selected from four different cycles. That is, a set of four filtered fGRate vectors satisfying the selection criteria and generated during four different tracker cycles are combined with four filtered rate of change of orientation vectors fHRate$_o$, derived from measurements H$_o$A by the Optical Helmet Tracker 10, synchronised with the four selected fGRate vectors by the techniques described above. The four selected fGRate vectors each define points in 'gyro rate space'. That is, the components of an fGRate rate vector define the rates of change in orientation of the Helmet-mounted Gyro sensor system 5 in inertial space resolved along the three gyro axes.

The selection criteria for acceptance of an fGRate vector into the sample set relate to the relative positions of the four points they define in gyro rate space, the distance between them and the magnitudes of the fGRate vectors themselves. For a new fGRate vector to qualify for inclusion in the set and to replace the oldest of the existing four vectors, the vector linking the point represented by the new fGRate vector to one of the three most recent points in the set—a designated 'reference' point—is required to be reasonably orthogonal to the plane of the other three points and to exceed a predetermined minimum magnitude. Each selected fGRate vector is also required to satisfy the condition that its individual magnitude falls within a predetermined range. The vectors linking the selected 'reference' point to the other three points in a set selected by these criteria define three edges of a tetrahedral shape, the four points themselves forming the vertices of such a shape. When an fGRate vector is selected, the rate vector fHRate$_o$ having the same time point of validity as the selected fGRate vector is also selected for the set. The fHRate$_o$ vector having the same time point of validity as that of the fGRate vector forming the 'reference' point in gyro rate space is taken to be the 'reference' point in the derived helmet orientation rate space.

The inventors of the present invention have realised that by working with vectors linking points in rate space, rather than the rate vectors themselves, it is possible to isolate errors due to misalignment and scaling, relating to the installation or manufacture of the Helmet-mounted Gyros 5, from errors due to gyro bias. The error, and hence the required correction, due to installation or manufacture of the Helmet-mounted Gyros 5, may be represented by a correction matrix as required to align the substantially tetrahedral arrangement of three linking vectors in gyro rate space to the three time-synchronised linking vectors in derived helmet orientation rate space.

The correction matrix is applied by the Apply Gyro Corrections component 35 to the GRate vector received in respect of the latest tracker cycle, with some control to lessen the impact on an associated display system of any larger scale change in the correction matrix over that from a previous corrections update cycle (to be discussed in detail below). The correction matrix is also used by the Calculate Gyro Bias component 40 to determine the bias error and hence the bias correction to be added by the Summing component 45 to the output of the Apply Gyro Corrections component 35.

To determine the bias error, a correction based upon the latest correction matrix is applied to the most recently available delayed (110) and filtered (120) fGRate vector for which a correspondingly synchronised delayed (105) and filtered (115) fHRate$_o$ vector is available, giving a point in the derived helmet orientation rate space. The bias error is then represented by the residual vector correction required to map that point in derived helmet orientation rate space to the point represented by the correspondingly synchronised fHRate$_o$ vector.

To assemble and maintain such a set of fGRate and fHRate$_o$ vectors, the Calculate Gyro Corrections component 30 is arranged, during each corrections update cycle, to test each newly received fGRate vector from the Filter 120 with respect to previously generated fGRate vectors according to the above selection criteria. For example, assuming that a new sample set is to be assembled from start-up or a restart of the system, the Calculate Gyro Corrections component 30 is arranged to implement the following procedure:

(1) If the magnitude of a latest received fGRate vector is below a predefined maximum, it is submitted for inclusion in the sample set of points in gyro rate space. On the first time through, e.g. following power-up or a restart of the system, the received fGRate vector and the corresponding latest received fHRate$_0$ vector are selected as the 'reference' points in the sample set in their respective rate spaces.

(2) Upon receipt of another fGRate vector, defining a new point in gyro rate space, if the magnitude of the vector linking the new point to the reference point in gyro rate space exceeds a predefined minimum, the new point then becomes the reference point and its vector displacement from the previous reference point is the first linking vector in gyro rate space. The corresponding fHRate$_o$ vector is also selected and becomes the new reference point in derived helmet orientation rate space, the vector displacement of the new to the previous reference point becomes the first linking vector in derived helmet orientation rate space.

(3) Test each subsequently received fGRate vector until one is found for which the magnitude of a vector linking the new point to the reference point in gyro rate space exceeds the predefined minimum and the new vector is reasonably orthogonal to the first linking vector. The latest point satisfying these criteria then becomes the new reference point, giving two reasonably orthogonal linking vectors in gyro rate space. The corresponding fHRate$_o$ vector is also selected and becomes the new reference point in derived helmet orientation rate space.

(4) Test each subsequently received fGRate vector until one is found for which the magnitude of the vector linking the new point to the reference point in gyro rate space exceeds the predefined minimum and the new vector is reasonably orthogonal to the plane of the first two linking vectors. The latest point then becomes the new reference point in gyro rate space. The corresponding fHRate$_o$ vector is also selected and becomes the new reference point in derived helmet orientation rate space. This results in a set of four points in gyro rate space and a corresponding set of four points in derived helmet orientation rate space, each set of four points defining three linking vectors extending from the reference point to the other three points in the respective rate space.

The parameters defining 'minimum' magnitude and 'reasonably orthogonal' are defined during a system configuration process, the objective being to ensure that the resultant vectors linking the four points in gyro rate space are 'reasonably' tetrahedral in configuration, i.e. each point lies at least a minimum distance away from the plane of the other three points.

During any one corrections update cycle, there may be more than one new fGRate vector available, for example where the tracker cycle period (matched to the period between successive samples of rate data from the Helmet-mounted Gyros 5) is a predetermined fraction of the corrections update cycle period (matched to the period between successive measurements of helmet orientation by the Optical Helmet Tracker 10). Optionally, all fGRate vectors available during any one corrections update cycle may be tested for acceptance into the sample set until at least one is accepted according to the selection criteria, or only one fGRate vector may be selected for testing during each corrections update cycle.

When a set of four points in gyro rate space—fGRate vectors—and four corresponding points in derived helmet orientation rate space—fHRate$_o$ vectors—have been acquired satisfying the selection criteria, the Calculate Gyro Corrections component 30 is triggered to begin a new calculation of the correction for misalignment.

Updates to an already assembled sample set are made according to the further step:
(5) Test each subsequently received fGRate vector in the same way to determine whether the new vector is suitable. That is:
  The magnitude of a vector linking the new point to the reference point in rate space exceeds the predefined minimum;
  The direction of the vector linking the reference point and the new point is reasonably orthogonal to the plane of the previous two linking vectors in gyro rate space, i.e. the vectors formed by the three most recently accepted points.
If accepted, the latest fGRate vector defines the reference point and its vector separation from the previous reference point replaces the oldest of the three linking vectors in gyro rate space. The corresponding fHRate$_o$ vector is also selected and becomes the reference point in derived helmet orientation rate space, replacing the oldest point in derived helmet orientation rate space.

The number of corrections update cycles required to assemble a set of four suitable fGRate vectors depends upon the type of helmet movement taking place at the time and may therefore vary. The required number of corrections update cycles may be reduced if more than one new fGRate vector is available during each corrections update cycle, for example if multiple tracker cycles have elapsed within the period of one corrections update cycle, and if the helmet movement at the time results in the required variation between successive samples of GRate$_g$ vectors.

Acceptance of a new fGRate vector into an existing sample set of four points triggers a new calculation by the Calculate Gyro Corrections component 30 during which a 3×3 correction matrix M is calculated, representing a transformation to align the set of three linking vectors in gyro rate space to the three corresponding linking vectors in derived helmet orientation rate space.

As mentioned above, various techniques may be applied to control the introduction of an update to a correction matrix M by the Apply Gyro Corrections component 35 for a given tracker cycle. A combination of stabilisation control and damping techniques may be applied, for example within the Apply Gyro Corrections component 35, with the objective of reducing the impact of potentially large corrective swings upon the repositioning of symbols in an associated display of tracked symbols while the fGRate data are being gathered and the quality of the assembled sample set and hence of the calculated corrections is being refined. According to the applied stabilisation control technique, a diminishing proportion of a correction determined during a current corrections update cycle is mixed with a correspondingly increasing proportion of the correction determined during the immediately preceding corrections update cycle. This provides for a relatively large correction in the first correction cycle and successively smaller corrections over subsequent correction cycles, by which time the system may be expected to have stabilised. Meanwhile, at the tracker cycle level, a damping process gradually applies a newly determined correction over a number of tracker cycles so that not only is the height of each new corrective step diminished over a number of corrections update cycles, by the stabilisation control process, but each corrective step is also introduced gradually over a number of the intervening tracker cycles, so preventing an abrupt correction being applied to gyro rate data (and hence to the repositioning of symbols in the display) while the correction stabilises.

The calculation of corrections and the application of stabilisation and damping techniques according to the present invention will now be described in more detail.

Having triggered a new corrections calculation by an acceptable update to the sample set, the Calculate Gyro Corrections component 30 first calculates a new misalignment matrix Mis according to:

$$Mis = DHr \cdot DGr^{-1} \qquad (2)$$

where
  DGr is a 3×3 matrix whose columns comprise the three linking vectors in gyro rate space expressed as column vectors; and
  DHr is a 3×3 matrix whose columns comprise the three corresponding linking vectors in derived helmet orientation rate space expressed as column vectors.

In a typical helmet tracker installation, the misalignment matrix Mis is likely to remain substantially unchanged from one correction cycle to the next, having stabilised. However, until stabilisation is achieved, as more data are collected, the calculated misalignment matrix Mis will be updated, possibly sporadically, but gradually stabilises to a matrix representing the 'true' gyro misalignment correction. The time required to achieve stabilisation depends upon the type of helmet movement taking place. During that time, by the stabilisation control technique mentioned above and to be described below, some control may be applied to reduce the potential effects on an associated display system, for example, of the evolving sporadic corrections. Once stabilisation is achieved, the misalignment matrix Mis is only likely to change significantly if there is an impact or other cause of a change in the alignment of the Helmet-mounted Gyros 5 on the helmet if not firmly fixed. However, in other applications of the present invention, for example to a head-mounted tracker system intended for use with computer gaming head-mounted displays, it is possible that there will be a need for frequent adjustments to the misalignment corrections to be calculated and applied. The present invention provides the means for making those adjustments automatically, as and when they are required, provided that the helmet reference frame and hence the frame of reference of the associated non-inertial tracker system (10) remains fixed.

Having calculated a misalignment matrix Mis from the latest sample set of rate vectors, a new correction matrix M is computed, applying the stabilisation control technique, according to the equation:

$$M = dM \cdot Mis + (1-dM) \cdot GMis \qquad (3)$$

where M is the new correction matrix, GMis is the misalignment matrix from the immediately preceding corrections update cycle and dM defines a proportion of the contribution to the correction matrix M by the newly calculated misalignment matrix Mis versus the contribution from an immediately preceding misalignment correction GMis. The parameter dM begins at a relatively high value (close to 1), allowing a relatively large corrective effect on the first corrections update cycle by a newly calculated misalignment matrix Mis, but the contribution of successive calculated updates to the matrix Mis is reduced in stages to a predefined minimum value in comparison with the corrective effect provided by the immediately preceding update to the matrix Mis, as the correction evolves. This has the effect of reducing the peak 'amplitude' of subsequent corrections defined by updates to the matrix M.

In between updates to the correction matrix M, the above-mentioned damping process is applied by the Calculate Gyro Corrections component 30 to introduce each new correction represented by the matrix M gradually over a number of tracker cycles. By this process, the actual correction GMis' that is to be applied by the Apply Gyro Corrections component 35 to the GRate data for the latest tracker cycle is calculated according to the equation:

$$GMis' = (1-k_M) \cdot GMis + k_M \cdot M \qquad (4)$$

where GMis' is the correction matrix to be used in respect of the latest tracker cycle, GMis is the correction matrix from the previous tracker cycle, $k_M$ is a fixed pre-configured constant of integration for the misalignment correction and M is the correction matrix determined by equation (3) for the current corrections update cycle. The damping process is an iterative process in which the correction matrix GMis' replaces GMis in equation (4) when determining the correction to be applied for the next tracker cycle so that the correction represented by GMis gradually converges to the correction represented by M over a number of tracker cycles, or until a new corrections calculation is triggered and the correction matrix M is re-calculated.

For each new tracker cycle for which a new filtered rate vector $fHRate_o$ is available from the Filter component 115, synchronised with the filtered gyro rate vector fGRate from that new tracker cycle, the latest correction matrix GMis', as calculated according to equation (4), is applied by the Calculate Gyro Bias component 40 to the filtered gyro rate vector fGRate to give a point in the derived helmet orientation rate space. A new bias correction vector B is calculated by the Calculate Gyro Bias component 40 as the vector translation B in the derived helmet orientation rate space between the point represented by the corrected fGRate vector and the point represented by the corresponding synchronised rate vector $fHRate_o$ according to the equation:

$$B = fHRate_o - GMis' \cdot fGRate \qquad (5)$$

Gyro bias tends to be temperature-related and so changes relatively slowly, but the bias correction is calculated at each tracker cycle for which a new synchronised pair of filtered rate vectors $fHRate_o$ and fGRate are available to the Calculate Gyro Bias component 40. An iterative damping process, similar to that applied to the correction matrix M according to equation (4), may be applied by the Calculate Gyro Bias component 40 to the application of each new bias correction B to smooth the application of a new bias correction over several tracker cycles. By this process, the actual bias correction vector output by the Calculate Gyro Bias component 40, to be applied by the summing component 45 to the corrected GRate vector output by the Apply Gyro Corrections component 35, is calculated according to the equation:

$$GBias' = (1-k_B) \cdot GBias + k_B \cdot B \qquad (6)$$

where GBias' is the bias correction vector to be applied in respect of the latest complete tracker cycle, $k_B$ is a pre-configured constant of integration for the bias correction, GBias is the bias correction vector from the immediately preceding complete tracker cycle and B is the new bias correction vector determined by equation (5). As this damping process is an iterative process, GBias' replaces GBias in equation (6) when determining the bias correction vector to be applied for the next tracker cycle so that the correction represented by GBias gradually converges to the required bias correction over a number of tracker cycles. The constant $k_B$ is chosen to ensure that the applied bias corrections keep pace with the bias drift but suppress noise. However, the accuracy of the bias correction applied depends upon the accuracy of the misalignment correction matrix M. The accuracy of that improves with the capture of more data and the same is therefore true of the bias corrections.

As an alternative to using a fixed value for the parameter $k_B$ in equation (6), which may result in a large number of cycles for the bias vector to converge to a valid state following initialisation of the correction calculation components 30, 40, the parameter $k_B$ may be replaced in equation (6) by the value $1/n$, where n is the number of completed bias calculations by the component 40 for which $1/n > k_B$. As a result, the first n iterations of equation (6) will return the cumulative average bias vector. For subsequent iterations, equation (6) may be applied using the constant value $k_B$ to give a smooth transition to exponential filtering. The bias vector will therefore be close to its calculated value from the outset and can be used without waiting for the smoothing process to converge.

When the bias correction vector GBias' is added by the summing component 45 to the output of the Apply Gyro Corrections component 35, the result is, when stabilised, a fully corrected rate of change in helmet orientation vector $$HRate_c = GMis' \cdot GRate + GBias' \qquad (7)$$

for the latest tracker cycle.

The correction matrix M may be initialised, for the purposes of system power-up or reset, to a nominal state at the time of system configuration, representing a best estimate of the misalignment between gyro axes and helmet-referenced axes obtained from off-aircraft calibration or design data. The bias correction vector B may be initialised upon system start-up or reset to represent a zero displacement.

As mentioned above, as an alternative to operating a dynamic process of calculation of gyro misalignment or scaling errors, if such errors are unlikely to vary during operation in a particular application, the correction matrix M may be determined by trials prior to operation of the tracker system and stored for subsequent retrieval and application on the assumption that it will not need to be changed. The Apply Gyro Corrections component 35 may then apply the predetermined misalignment correction matrix M to received gyro rate data GRate at each tracker cycle. The Calculate Bias Corrections component 40 may operate at each tracker cycle to compensate for bias drift, but using the predetermined misalignment correction matrix M in the calculation of any updates to the bias correction vector B. Application of the above-described stabilisation and damping techniques in respect of the correction matrix M may also be suspended during steady state operation.

Calculation of Helmet Orientation

The Integrator component 50 receives the fully corrected rate of change in helmet orientation vector $HRate_c$ in respect of the latest complete tracker cycle and inserts it into an integration process, to be described in more detail below, to determine a helmet orientation relative to World axes expressed as a quaternion HW. In parallel with this, the Predictor 55 operates to predict how the helmet orientation will change over the Prediction time period $T_p$ from the time point of validity of the helmet orientation HW at the end of the latest complete tracker cycle.

The Predictor 55 operates by firstly estimating the average rate of change of orientation of the helmet over the Prediction time period $T_p$ or over some other 'Estimation Time' period that may vary in certain circumstances, as will be discussed below. The average rate of change may be calculated by means of a Recursive Least-Squares (RLS) filter, acting as an adaptive FIR filter in which the weights are continuously adjusted to match the output to a desired signal. In this case, the desired signal is the average rotation rate vector over the Estimation Time period immediately preceding the latest input. The adaptive part of the filter finds the weights that, when applied to the n inputs immediately preceding the time of the latest input minus the Estimation Time period, best match the rotation rate vector averaged over the most recent period of Estimation Time, where n is the tap count of the filter. These weights are then applied to the n most recent inputs to estimate the mean rotation rate vector over the forthcoming period of Estimation Time.

The estimated rotation rate vector is then integrated over the Prediction Time period $T_p$ to give the predicted change in helmet orientation $H_pH$ relative to the latest determined helmet orientation HW. The predicted helmet orientation $H_pW$ relative to World axes is then obtained by the summing component 60 by quaternion multiplication of the latest helmet orientation HW output by the Integrator 50 and the predicted change in orientation according to the equation:

$$H_pW = HW \times H_pH \qquad (8)$$

The integration process implemented by the Integrator component 50 to integrate received corrected rate vectors $HRate_c$ and to calculate HW includes a process for nulling an integration error E. There are two main sources of the integration error E: one due to a slowly changing difference in the integrated gyro rate data over orientation (in the inertial reference frame) derived from the optical tracker data; and one arising following start-up, a re-start or following loss of optical tracking for some lengthy period, likely in each case to result in a large integration error, at least initially. To counter the effects of the former, the nulling process continually applies a slow forcing function to null the slowly changing difference between the integrated gyro rate data and orientation (in inertial space) derived from the optical tracker output. To overcome the latter, where the integration error E exceeds a predetermined threshold, the nulling process applies a sharp forcing function to force the integrated gyro rate data to align more closely with the orientation (in inertial space) derived from the optical tracker data. The nulling process will now be described and discussed in more detail.

The nulling process is designed to make use of the best features of two different data sources—a fully corrected helmet orientation rate vector $HRate_c$ and a correspondingly synchronised, interpolated estimate $iH_oW$ of helmet orientation derived by the Transform component 20. The fully corrected rate vector $HRate_c$ has the benefit of being substantially noise-free, but the disadvantage of being based upon rate measurements that are subject to bias that is likely to vary over time. In comparison, the interpolated helmet orientation $iH_oW$ derived from Optical Helmet Tracker 10 output gives a reliable measure of helmet orientation at the time it was determined, but is subject to some noise, typically of the order of 0.3 milli-radians rms. The inventors have realised that any contribution to the integration error arising from a change in gyro bias is likely to evolve relatively slowly over time. Therefore, any correction required to null the integration error based upon these data sources is likely to be valid at the time it is calculated and results in a good starting point for adding the predicted adjustment determined by the Predictor component 55.

The error nulling process operates iteratively over a number of cycles and aims to provide a best estimate of the helmet orientation HW at the end of each complete tracker cycle by calculating an adjustment to the fully corrected rate vector $HRate_c$ to give an adjusted rate vector which would have resulted in a null integration error E. From this adjusted rate vector, an adjustment to HW is then calculated and applied to the latest integration result to give a determined helmet orientation HW relative to World axes to which the output of the Predictor component 55 may be added.

The integration error E is estimated as the difference between a most recently available interpolated measure $iH_oW$ of helmet orientation, valid at the end of a tracker cycle (at a time point tGRate( ) as discussed above with reference to FIG. 2a), and a result $HW_{del}$ of integrating a corrected gyro rate vector $HRate_c$ that was valid at the same time point. The difference may be expressed as an angle/axis vector:

$$E = \text{AngleAxis}(iH_oW \times HW_{del}) \qquad (9)$$

where AngleAxis denotes conversion from a quaternion representation to an angle/axis representation, $iH_oW$ is the most recently available interpolated measure of derived helmet orientation synchronised to the end of a tracker cycle and $HW_{del}$ is the delayed helmet orientation determined by the Integrator 50 in respect of the tracker cycle of validity of the interpolated measure $iH_oW$.

An appropriate delay may be applied to the integration results for this purpose so that an integration result HW may be selected having a time point of validity that is the same as that of the available interpolated measure $iH_oW$. If the Optical Helmet Tracker 10 is being operated at a slower rate than the tracker cycle rate, for example providing new data every second or third tracker cycle, the nulling process may operate to update the integration error correction only in respect of those tracker cycles for which an updated interpolated helmet orientation $iH_oW$ is available, paired with an appropriately synchronised (delayed) integration result $HW_{del}$, again without suffering any significant loss of accuracy. For those tracker cycles having no new interpolated measure $iH_oW$ available, for whatever reason, the correction for integration error will be held at the same value until an update to the correction can be calculated.

Once everything has settled down, the nulling process should be keeping the integration error to a minimum level and the Predictor component 55 should be operating all the time while the Integrator component 50 is operating. However, if tracking by the Optical Helmet Tracker 10 is lost and the maximum time allowed for 'coasting' expires, then a phased restart of the tracker system may be performed when output from the Optical Helmet Tracker 10 resumes. In this situation, the output of the Integrator component 50 may be marked invalid for a number of cycles to allow the error nulling process to converge and the output of the Predictor component 55 may also be marked as invalid for a number of cycles after the restart.

If the magnitude of the error E is found to be greater than a pre-configured critical error limit Ecrit, then an adjusted rate of change of helmet orientation is firstly calculated according to the equation:

$$Ra = HRate_c - qForce \cdot E \tag{10}$$

where $HRate_c$ is the latest fully corrected rate vector output by the summing component 45, E is the integration error calculated according to equation (9) and qForce is configurable parameter. The objective in applying equation (10) to adjust the corrected helmet rate vector $HRate_c$ so as to cause a rapid exponential convergence of the integration error towards zero error, should the error be large. This process continues within the Integrator component 50 until the error E is brought within the pre-configured critical error limit Ecrit.

When the integration error has been brought to within the pre-configured error limit, i.e. |E|≤Ecrit, or if the integration error was already within that limit, then an adjusted rate of change of helmet orientation Ra is calculated according to the equation:

$$Ra = HRate_c - \Sigma E dt - KE \tag{11}$$

where $HRate_c$ is the fully corrected rate vector output by the summing component 45, E is the latest integration error calculated for the immediately preceding complete tracker cycle expressed in angle/axis form, K is a damping factor and dt is the error correction cycle period.

By way of background, equation (11) is derived from the so-called 'damped spring' equation $$\frac{d^2 E}{dt^2} = -aE - b\frac{dE}{dt}$$

where the integration error E is analogous to the displacement of a unit mass. The damped spring equation embodies the characteristics that:

the mass is subject to a force of attraction towards zero displacement that is proportional to the displacement; and the mass is subject to drag (damping force) acting in opposition to its direction of motion and proportional to the speed of motion.

In this case "zero displacement" corresponds to the target result $H_oW$ derived from the result of optical tracking of the helmet.

Solving for dE/dt gives:

$$\frac{dE}{dt} = -a \int E dt - bE$$

This is what is added to the basic corrected rate $HRate_c$ in equation (11) so that the integrated result is pulled toward the target result while damping out noise in the target result. The constant b is the damping factor K in equation (11). The constant a in equation (11) is given the value 1, but this may optionally be introduced as a configurable constant. The factors a and K have dimensions that result in the correct units for dE/dt. The aim of equation (11) is to achieve critical damping, i.e. to ensure that the integrated rate vector converges as rapidly as possible towards the target (optically tracked) orientation result without overshooting it, causing the optical tracking target result to correct the integrated-rate result while suppressing optical tracking noise.

From this adjusted rate vector, calculated according to equation (10) or equation (11), as applicable, an adjusted helmet orientation HW is found by integrating the adjusted rate Ra over one tracker cycle period to give the change in helmet orientation over the last tracker cycle, providing an adjustment $HW_{adj}$ that may be applied to the helmet orientation $HW_{prev}$ as determined during the immediately preceding tracker cycle to give a revised estimate HW' of helmet orientation in respect of the latest complete tracker cycle:

$$HW' = \text{normalise}(Hw_{prev} \times HW_{adj}) \tag{12}$$

where normalise denotes normalisation to a unit quaternion. This normalisation function is carried out to prevent deviation of HW from a unit quaternion over many cycles due to the accumulation of small errors. The revised helmet orientation HW' is passed forward to the summing component 60 to be added to the output of the Predictor 55 to give the predicted helmet orientation relative to World axes.

When the tracker system 1 switches to a coasting mode of operation, no attempt is made to estimate the integration error or adjust the corrected gyro rate vector until the Optical Helmet Tracker 10 is again able to determine helmet orientation. Instead, the corrected gyro rate vector $HRate_c$ is directly integrated over the one tracker cycle period to find the change in helmet orientation since the end of the previous complete tracker cycle, this orientation change being used as the quaternion $HW_{adj}$ in the equation (12) from which an adjusted helmet orientation HW is then calculated.

As mentioned above, a final stage of filtering may be applied by a Filter component 125 to the predicted helmet orientation $H_pA$ with respect to aircraft axes in a further level of refinement. The final stage of filtering may be arranged to take account of the effects of buffeting that may be affecting the helmet in a process that will now be described with reference to FIG. 4.

Figure 4:
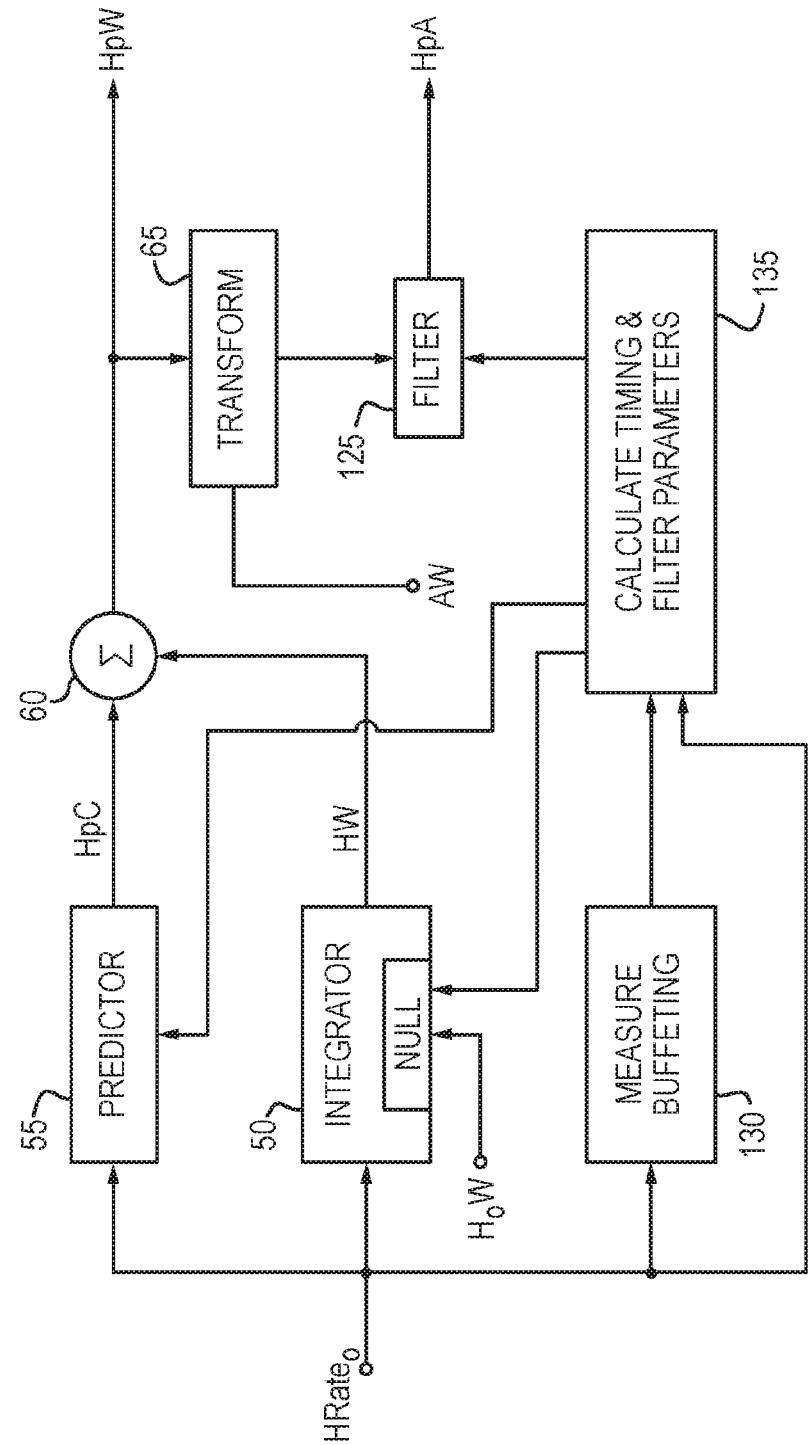
FIG. 4 depicts a section of the functional architecture of FIG. 3 in more detail, including supplementary features according to an example embodiment of the present invention.

Referring to FIG. 4, a logical architecture for the final stages of the hybrid tracker system 1 is shown in more detail as a collection of interworking functional blocks designed to implement a process for detecting helmet buffeting, transferred from the aircraft, or other instances of rapid helmet movement and for helping to mitigate their effects upon the user's ability to read an associated display. The purpose of this process is to produce a buffeting measurement that indicates the severity of buffeting to which the helmet is being subjected. Buffeting is classed as involuntary changes in helmet rotation, usually at frequencies in the region of 10 Hz or above, caused by the transmission of aircraft buffeting to the user's head. The buffeting measurement may be used to modify the behaviour of the Integrator 50, Predictor 55 and Filter 125 to help counteract its effect.

A Measure Buffeting component 130 is provided, arranged to detect helmet movements indicative of buffeting or rapid head movement from the received data, and a Calculate Timing and Filter Parameters component 135 arranged to alter the operating parameters of the Integrator 50, Predictor 55 and Filter 125 to mitigate the effects of the detected buffeting or rapid head movement. The measurement of buffeting is derived from the received corrected helmet rate vectors $HRate_c$ and is performed by a two-stage filter to produce an instantaneous measurement followed by a filtering of the measurement itself.

The first stage filter operates directly on the received helmet rate vectors $HRate_c$ and comprises an FIR filter with symmetric weighting over a predefined time period, including a number of tracker cycles, representing a history of corrected rate vectors. The weighting is at a maximum at the midpoint of the time period and follows a half sine-wave function. Alternatively, with the benefit of reduced processing requirements, the weightings may be uniform across the whole history. For each received rate vector, the filter produces a weighted average rate vector over the history of received rate vectors. This is compared with the mid-history rate vector to produce a delta vector.

The second stage filter takes the same form as the first stage filter but acts on the delta vectors. Again, the filter output is compared with the mid-history input to provide a second order delta vector. The magnitude of this vector is then taken as the instantaneous buffet measurement and is limited to a preconfigured maximum value.

The instantaneous buffet measurement is put through a final filter stage, consisting of a uniformly weighted average, to produce the buffeting severity measurement that is output from the Measure Buffeting component 130 to the Calculate Timing and Filter Parameters component 135.

The Calculate Timing and Filter Parameters component 135 receives the latest buffet level and the latest helmet rotation rate vector $HRate_c$ and calculates parameters that may modify the behaviour of the Predictor component 55 and the output Filter component 125. The calculated parameters are:

Estimation Time—the future period over which the mean helmet rotation rate vector is estimated by the Predictor component 55 ahead of the tracked helmet orientation, if different to the Prediction Time $T_p$;

Integration Time—the time over which the estimated mean rotation rate vector is integrated by the Predictor component 55 to predict the change in helmet orientation $H_pH$ during that time; and Filter Latency—the latency required for the final output Filter 125.

Under normal conditions, Estimation Time and Integration Time are both equal to the demanded Prediction Time $T_p$ and the Filter Latency is set to a configured base value. The Estimation Time can be reduced and the filter latency increased in the presence of high levels of buffeting. During rapid helmet rotation, both the Estimation Time and the Integration Time can be extended by the base latency of the output filter.

The first step in this process is to determine the state of a buffet flag. The Buffet Flag indicates whether the level of buffeting warrants any change from the "normal conditions" behaviour of the predictor. The flag is set if the Buffet Level BL calculated by the Measure Buffeting component 130 exceeds a predefined upper threshold and reset if the Buffet Level BL falls below a lower threshold. If the Buffet Level BL is between the two thresholds, the flag is unchanged. This provides hysteresis in the control of the flag.

The Calculate Timing and Filter Parameters component 135 calculates a scaled buffet level as the input buffet level divided by the preconfigured maximum buffet level value used to set the buffet flag. If the buffet flag is set, the scaled buffet level is used to calculate the latency for the predictor output Filter component 125, where greater latency means heavier filtering:

$$L = SL \cdot \log_2 b + BL \tag{13}$$

where L is set to the predefined base latency of the output filter (which is less than BL) and is limited to a maximum latency for the Filter 125, the log term is replaced by zero if it goes negative, SL is a configurable sensitivity factor, BL is a baseline factor for filtering in buffet conditions and b is the scaled buffet level. The maximum permitted latency for the Filter 125 is a predefined constant.

The Estimation Time and Integration Time of the predictor are nominally both equal to the demanded Prediction Time $T_p$ but may be modified by conditions of high buffeting or high rotation rate. If the buffet flag is set and the scaled buffet level exceeds a predefined high level, the Estimation Time is reduced to one cycle. If the buffet flag is not set but the helmet rotation rate exceeds a predefined threshold, the base filter latency is added to the demanded prediction time for both estimation and integration. Under all other conditions both Estimation Time and integration Time are set to the demanded prediction time. An example logic for calculating Estimation Time and Integration Time is shown in the following table.

| | | | | |
|---|---|---|---|---|
| Buffet flag set | F | F | T | T |
| Scaled buffet level > high threshold | X | X | F | T |
| $\|Hrate_c\|$ > high rate threshold | F | T | X | X |
| Estimation Time = demanded $T_p$ | ✓ | — | ✓ | — |
| Estimation Time = cycle time | — | — | — | ✓ |
| Estimation Time = demanded $T_p$ + base latency | — | ✓ | — | — |
| Integration Time = demanded $T_p$ | ✓ | — | ✓ | ✓ |
| Integration Time = demanded $T_p$ + base latency | — | ✓ | — | — |

The Filter component 125 is arranged to apply a final low-pass filter to the predicted helmet orientation $H_pA$, normally with a low latency. The latency may be increased according to equation (13) to mitigate the effects of buffeting and is always defined as an exact number of tracker cycles.

The basic filter type is a Hanning FIR filter. A separate set of weights is pre-configured for each allowed latency from 0 to the maximum allowed latency. In the case of zero latency, the weight set is just the single value 1.0. In general the weight set comprises (2L+1) values where L is the required latency. The selected set of n weights is applied to each component of the most recent inputs of the $H_pA$ quaternion. It is assumed that rotation over the maximum latency period is small enough for a simple weighted average of quaternions to be valid, provided the result is normalized. To smooth out discontinuities in the output caused by changes in latency, the following method is used.

The previous cycle's input is re-filtered with the current weights, i.e. the weights selected by the latest filter Latency input L from equation (13). The difference between the last output and the re-filtered output is used to update a delta which is then added to the current filtered output:

$$\Delta v' = \text{fade}(\Delta v + \text{filt}_- - \text{refilt}_-) \tag{14}$$

$$v = \text{flit}_0 + \Delta v' \tag{15}$$

where
- Δv is the delta (initialized to zero) to be applied to the filtered value;
- fade is a fade factor (<1) which causes Δv to decay towards zero in the absence of discontinuities;
- filt_ is the filter output from the previous cycle;
- refilt_ is the re-filtered output applying the current cycle's weights to the previous cycle's input;
- $filt_0$ is the filter output applying the current cycle's weights to the current cycle's input; and
- v is the required output value.

Finally, the filtered output is normalized to a unit quaternion by the Filter 125.

Having calculated and filtered the predicted helmet orientation $H_pA$ with respect to aircraft axes as a quaternion, it may be convenient to convert the quaternion representation of orientation into an Euler angle representation, providing the equivalent azimuth, elevation and roll angles, by a well-known method, according to the requirements of a user of the calculated orientation.

Implementation

A typical implementation of a helmet tracker system according to example embodiments of the present invention described above will now be described with reference to FIG. 5.

Figure 5:
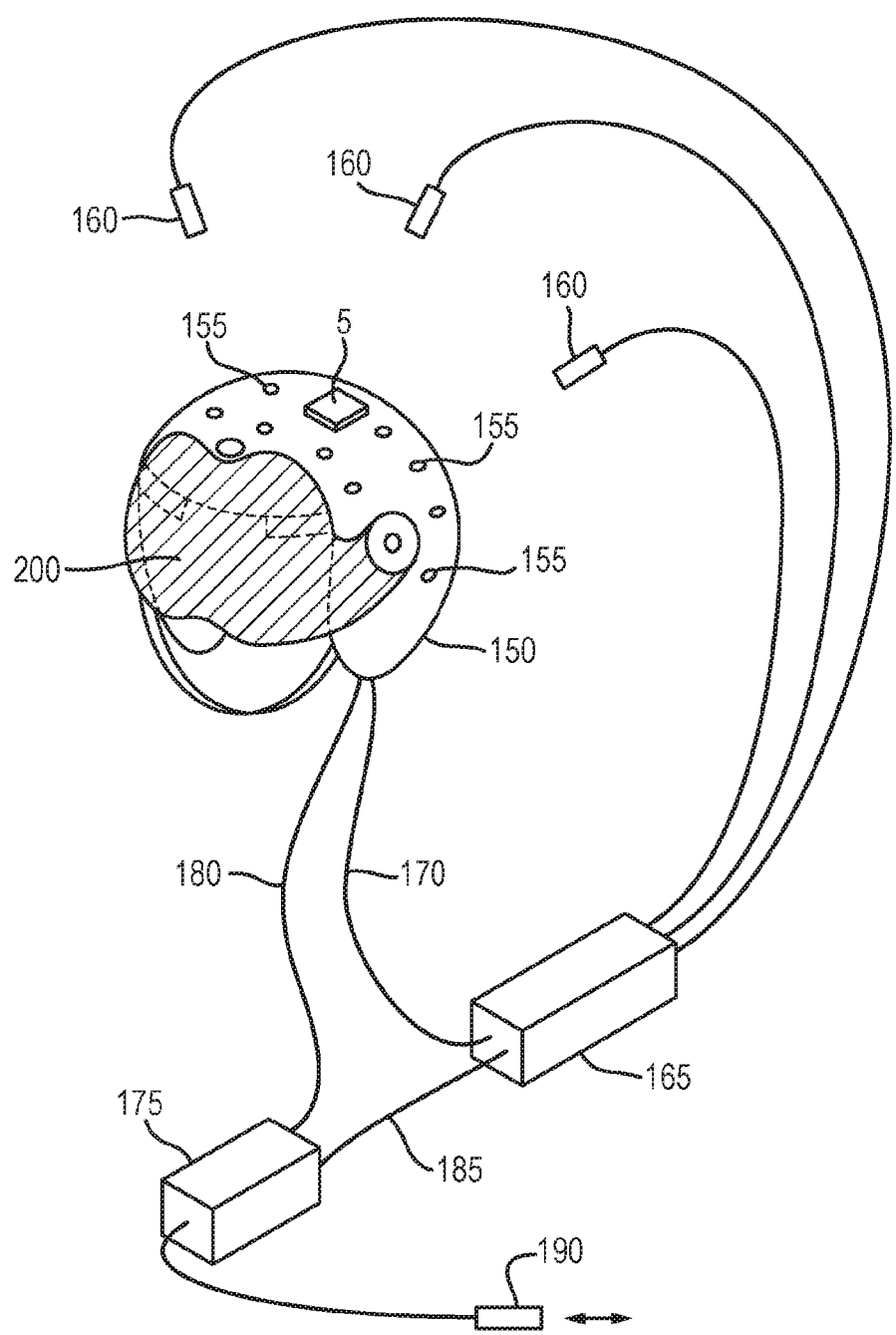
FIG. 5 depicts a representation of a helmet with components suitable for implementing a helmet tracker system according to example embodiments of the present invention.

Referring to FIG. 5, a helmet tracker system is shown integrated with a helmet 150. The helmet tracker system comprises a Helmet-mounted Gyros 5 component, typically a single inertial sensor module containing three gyro elements, fitted to the external shell of the helmet 150, and an Optical Helmet Tracker system. The Optical Helmet Tracker system comprises an arrangement of LEDs 155 integrated within or mounted upon the external shell of the helmet 150 and an arrangement of one or more Cameras 160, each mounted at a fixed position, e.g. within an aircraft cockpit, such they have a line of sight view to at least some of the LEDs 155 at any likely orientation of the helmet 150.

An Optical Helmet Tracker Controller 165 is linked to each of the Cameras 160 to receive image data resulting from the detection of light emitted by the LEDs 155 within the camera's line of sight. The Controller 165 is also linked to the LEDs 155 in the helmet 150 by means of an appropriate Cable 170 such that it may control the illumination of the LEDs 155. The Controller 165 is arranged, for example, to trigger a cyclic illumination of the LEDs 155 in predetermined patterns, to receive the resultant image data from the Cameras 160. The Controller 165 includes a digital processor programmed to implement an appropriate Optical Helmet Tracker algorithm, or a combination of hardware and software-implemented functionality, arranged to illuminate the LEDs 155 and to interpret the resultant image data from the cameras 160 to determine helmet orientation relative to a frame of reference associated with the aircraft, in this example.

A further Processing Module 175 is provided to implement the functionality of the overall helmet tracker system as described above with reference to FIGS. 1 to 4. The Processing Module 175 is linked to the helmet 150 by means of an appropriate Cable 180, principally to receive rate data $GRate_g$ output from the Helmet-mounted Gyros 5, but also to convey image data received from an aircraft-installed image generation system (not shown in FIG. 5), via an interface 190, to a helmet-mounted display integrated within the helmet 150 (not shown explicitly in FIG. 5). The helmet-mounted display system may be a visor-projection display system, or a waveguide-based display, arranged in either case to present images to the pilot such that they appear overlain upon the pilot's view through a visor 200 of an external scene. The Processing Module 175 is arranged to output predicted measures of helmet orientation $H_pA$ and $H_pW$ to the aircraft-installed image generation system via the interface 190 for use in calculating the position of certain types of symbol and data intended for display in the helmet-mounted display, as appropriate.

In a typical aircraft installation of a helmet-mounted display system, incorporating the hybrid helmet tracker system of the present invention, one or more further modules (not shown in FIG. 5) are likely to be installed within the aircraft for the purposes of generating images for display by any display systems installed or in use on the aircraft. Such display systems may include a head-up display (HUD) and/or a head-down display (HDD) in addition to the helmet-mounted display of relevance to applications of the present invention. Such further modules are likely to be linked to a standard aircraft data bus and so have access to aircraft orientation data AW output by an Aircraft Navigation System and to data from other systems with a need to display information to the pilot. Image data including symbols and data for display on the helmet-mounted display, together with updates to aircraft orientation AW received over the aircraft data bus by such further modules, may be passed to the Processing Module 175 by means of the interface 190.

Example embodiments of the present invention have been described in the context of determining orientation of a helmet carrying a helmet-mounted display. This is one example of an application of a tracker system according to the present invention in which the determined orientation is required by an associated image generator to be able to position space-stabilised symbols in an image to be displayed. However, it will be clear to a person of ordinary skill in a relevant field that the techniques described herein may be applied to the determination of orientation of any object with reference to a moveable platform associated with the object, for example a platform on or in which the object is travelling at the time its orientation is to be determined.

It will also be clear to the notional skilled person that particular features may be applied independently of others to provide a tracker system according to the present invention having different combinations of the features described. For example, the techniques described for determining corrections to be applied to inertial sensor data may be used independently of others not essential to the determination of such corrections.

The invention claimed is:

1. A tracker system for determining orientation of an object relative to a moveable platform, comprising:
   - an inertial sensor arrangement associated with the object and arranged to output rate data indicative of a rate of change in orientation of the object in inertial space;
   - a non-inertial tracker system associated with the object, arranged to determine and to output orientation data indicative of orientation of the object relative to the moveable platform;
   - an input for receiving orientation data indicative of orientation of the moveable platform in inertial space;
   - a conversion component for receiving orientation data output by the non-inertial tracker system for converting a measure of orientation of the object relative to the moveable platform into a measure of orientation of the object in inertial space using a corresponding measure of orientation of the moveable platform in inertial space and for converting two or more successive measures of orientation of the object in inertial space into an estimate of the rate of change in orientation of the object in inertial space;

a corrector component arranged to calculate corrections to rate data output by the inertial sensor arrangement, using a plurality of substantially synchronised combinations of rate data output by the inertial sensor arrangement and rate data output by the conversion component and to apply the calculated corrections to a current measure of rate data by the inertial sensor arrangement; and a predictor component arranged to calculate, by integrating the corrected rate data output by the corrector component and by forward prediction, an orientation of the object in inertial space at a predetermined prediction time relative to a time point of validity of the corrected rate data.

2. The tracker system according to claim 1, wherein the corrector component is arranged to determine corrections for any one or more of:

misalignment of the inertial sensor arrangement with a frame of reference of the object;

misalignment of one or more sensors within the inertial sensor arrangement;

relative scaling;

inertial sensor noise; and inertial sensor bias.

3. The tracker system according to claim 2, wherein the corrector component is arranged to determine a correction for misalignment or relative scaling separately from a correction for inertial sensor bias.

4. The tracker system according to claim 2, wherein the corrector component and the predictor component are arranged to operate in a cyclic manner, the corrector component operating according to corrections update cycles and the predictor component operating according to tracker cycles.

5. The tracker system according to claim 4, wherein the corrections update cycle period is the same as the tracker cycle period.

6. The tracker system according to claim 4, wherein the corrections update cycle period is a predetermined integer multiple of the tracker cycle period.

7. The tracker system according to claim 4, wherein the corrections update cycle time period corresponds to a time period between successive time points of validity of orientation data output by the non-inertial tracker system.

8. The tracker system according to claim 4, wherein the tracker cycle time period corresponds to a time period between time points of validity of successive measures of rate data representative of a respective sample of rate data output by the inertial sensor arrangement during a tracker cycle.

9. The tracker system according to claim 4, further comprising a first filter component, arranged to receive a sample of rate data output by the inertial sensor arrangement during a tracker cycle period and to calculate for the received sample, and to output, a single measure of rate data representative of output by the inertial sensor arrangement during the tracker cycle.

10. The tracker system according to claim 9, further comprising a second predictor component arranged to receive inputs of orientation data indicative or orientation of the moveable platform in inertial space and to predict, from two or more successive said inputs, or using a rate derived therefrom, a measure of orientation of the moveable platform in inertial space at a time point of validity of orientation data output by the non-inertial tracker system.

11. The tracker system according to claim 4, wherein the conversion component is arranged:

to receive a sequence of outputs of orientation data by the non-inertial tracker system;

to receive a sequence of inputs of data indicative of orientation of the moveable platform;

to select, from the received sequences, an output of orientation data by the non-inertial tracker system having a time point of validity that falls between the time points of validity of two consecutive inputs of data indicative of orientation of the moveable platform and to determine, by interpolation, an estimate of the orientation of the moveable platform in inertial space at the time point of validity of the selected output of orientation data by the non-inertial tracker system; and to convert the selected output of orientation data by the non-inertial tracker system into a measure of orientation of the object in inertial space using the determined estimate of orientation of the moveable platform in inertial space.

12. The tracker system according to claim 11, wherein the correction component is arranged:

to receive a plurality of measures of rate data representative of output by the inertial sensor arrangement during a respective plurality of tracker cycles; and to select from the received plurality of measures of rate data a measure having substantially the same time point of validity as that of a measure of rate data output by the conversion component.

13. The tracker system according to claim 11, wherein the corrector component includes a second filter component arranged to receive measures of rate data output by the conversion component and to apply a filter thereto.

14. The tracker system according to claim 13, wherein the filter is a finite impulse response filter.

15. The tracker system according to claim 13, wherein the filter is an infinite impulse response filter.

16. The tracker system according to claim 1, further comprising a second conversion component arranged:

to receive the output from the predictor component of orientation of the object in inertial space;

to receive data defining an orientation of the moveable platform in inertial space; and to determine therefrom orientation of the object relative to the moveable platform.

17. The tracker system according to claim 1, wherein the non-inertial tracker system is an optical tracker system, an acoustic tracker system or a magnetic tracker system.

18. A head or helmet-mounted digital display device arranged to display space-stabilised symbols or other space-stabilised display artefacts, including a tracker system for determining orientation of the head or helmet according to claim 1 in which the object is a head or a helmet on which is mounted the head or helmet-mounted display and wherein the predetermined prediction time corresponds to an expected time between a time point of validity of sensor data and an expected time of displaying a space-stabilised symbol or other space-stabilised display artefact positioned by the display device to take account of an orientation of the head or helmet indicated by an output of predicted orientation by the tracker system.

19. A helmet-mounted display system for use in a moveable platform, the display system including a helmet tracker system according to claim 18 to determine a predicted orientation of the helmet for use in determining the position of artefacts for display, the helmet tracker system comprising an arrangement of inertial sensors mounted on the helmet and an optical tracker system comprising a plurality of switchable light sources mounted upon the helmet and one or more optical sensors mounted at respective known positions within the moveable platform.

20. A computer-implemented method for determining orientation of an object relative to a moveable platform, comprising the steps:
   (i) receiving, from an inertial sensor arrangement associated with the object, a sample of rate data indicative of a rate of change in orientation of the object in inertial space;
   (ii) receiving, from a non-inertial tracker system associated with the object, orientation data indicative of orientation of the object relative to the moveable platform;
   (iii) receiving, from a sensor system associated with the moveable platform, orientation data indicative of orientation of the moveable platform in inertial space;
   (iv) converting orientation data received at step (ii) into a measure of orientation of the object in inertial space using a corresponding measure of orientation of the moveable platform in inertial space determined from orientation data received at step (iii) and calculating, from two or more successive measures of orientation of the object in inertial space, rate data providing an estimate of the rate of change in orientation of the object in inertial space;
   (v) calculating corrections to rate data received from the inertial sensor arrangement using a plurality of substantially synchronised combinations of rate data output by the inertial sensor arrangement and rate data determined at step (iv) and applying the calculated corrections to a current measure of rate data from the inertial sensor arrangement; and
   (vi) using the corrected inertial sensor rate data to calculate, by integrating the corrected rate data output at step (v) and by forward prediction, an orientation of the object in inertial space at a predetermined prediction time relative to a time point of validity of the rate data corrected at step (v).

21. A computer program product comprising a data carrier having stored thereon software code means, or means for access thereto, which when installed and executed upon a digital processor are arranged to implement the method steps recited in claim 20.

22. A digital processor programmed to implement the method steps recited in claim 20.

23. A tracker system for determining orientation of an object relative to a moveable platform, comprising:
   an inertial sensor system associated with the object and arranged to output first rate data indicative of a rate of change in orientation of the object;
   a non-inertial tracker system associated with the object, arranged to determine and to output, first orientation data indicative of orientation of the object with reference to the moveable platform;
   an input for receiving second orientation data from a sensor system associated with the moveable platform arranged to output the second orientation data indicative of orientation of the moveable platform in inertial space; and
   at least one data processor connected to at least one memory that stores software instructions, where execution of the software instructions by the at least one data processor configured automatically:
      to calculate corrections to errors in the first rate data using second rate data derived from the first orientation data referenced to inertial space using the second orientation data and to apply the calculated corrections to the first rate data to determine third rate data; and
      to calculate, using the third rate data, an orientation of the object in inertial space at a predetermined prediction time relative to a time point of validity of the first rate data.

\* \* \* \* \*